United States Patent [19]

Matsumoto et al.

[11] Patent Number: 5,511,050
[45] Date of Patent: Apr. 23, 1996

[54] FOCUS ERROR DETECTING METHOD AND OPTICAL HEAD USING THE SAME

[75] Inventors: Kiyoshi Matsumoto; Takeshi Maeda, both of Kokubunji; Shigeru Nakamura, Tachikawa; Mariko Umeda, Tokyo; Masuo Kasai, Hachioji, all of Japan

[73] Assignee: Hitachi, Ltd., Tokyo, Japan

[21] Appl. No.: 705,535

[22] Filed: May 24, 1991

Related U.S. Application Data

[63] Continuation-in-part of Ser. No. 406,735, Sep. 13, 1989, Pat. No. 5,396,477.

[30]    Foreign Application Priority Data

| Sep. 21, 1988 | [JP] | Japan | 63-234978 |
| Jul. 10, 1989 | [JP] | Japan | 1-175462 |
| May 25, 1990 | [JP] | Japan | 2-133822 |
| Oct. 24, 1990 | [JP] | Japan | 2-284246 |

[51] Int. Cl.⁶ .................................................. G11B 7/00
[52] U.S. Cl. ............................... 369/44.23; 369/44.12; 369/112
[58] Field of Search ............................ 369/44.13, 44.37, 369/44.14, 32, 44.12, 44.11, 44.23, 44.24, 44.25, 44.26, 44.34, 44.41, 112, 110, 109, 124, 44.38

[56]    References Cited

U.S. PATENT DOCUMENTS

| 4,462,095 | 7/1984 | Chen | 369/44.14 |
| 4,656,618 | 4/1987 | Kaku et al. | 369/44.38 |
| 4,753,513 | 6/1988 | Shikama | 369/44.12 |
| 4,829,506 | 5/1989 | Boessers et al. | 369/112 |
| 4,847,478 | 7/1989 | Sugiura | 369/44.23 |
| 4,870,633 | 9/1989 | Matsushita et al. | 369/32 |
| 4,935,913 | 6/1990 | Shinoda | 369/32 |
| 5,043,965 | 8/1991 | Lida et al. | 369/44.13 |
| 5,046,061 | 9/1991 | Chaya et al. | 369/44.24 |
| 5,095,472 | 3/1992 | Uchino et al. | 369/44.14 |
| 5,105,076 | 4/1992 | Premji | 369/44.37 |
| 5,113,378 | 5/1992 | Kimura | 369/44.37 |
| 5,132,948 | 7/1992 | Ishibashi | 369/44.41 |

FOREIGN PATENT DOCUMENTS

| 53-19806 | 2/1978 | Japan. |
| 303632 | 7/1989 | Japan. |

OTHER PUBLICATIONS

Webster's Ninth New Collegiate Dictionary by Merriam–Webster, 1986 p. 111.

*Primary Examiner*—Nabil Z. Hindi
*Attorney, Agent, or Firm*—Antonelli, Terry, Stout & Kraus

[57]    ABSTRACT

A focus error detecting method and an optical head using it. In the focus error detecting method, a light beam is emitted from a light source, the beam is given positive and negative astigmatism by a diffraction grating or an acoustooptic element in a focusing optical system, beams thus formed are focused on an information recording surface, the beams reflected from the information recording surface are received by photo-detecting elements in separated optics, the reflected beams with positive and negative astigmatism are compared with each other to take a difference in a focus error detecting circuit, and a focus error detecting signal is obtained on the basis of the difference. The focus for the optical head can be adjusted using the focus error detecting signal.

30 Claims, 24 Drawing Sheets

F I G. I

FIG. 5
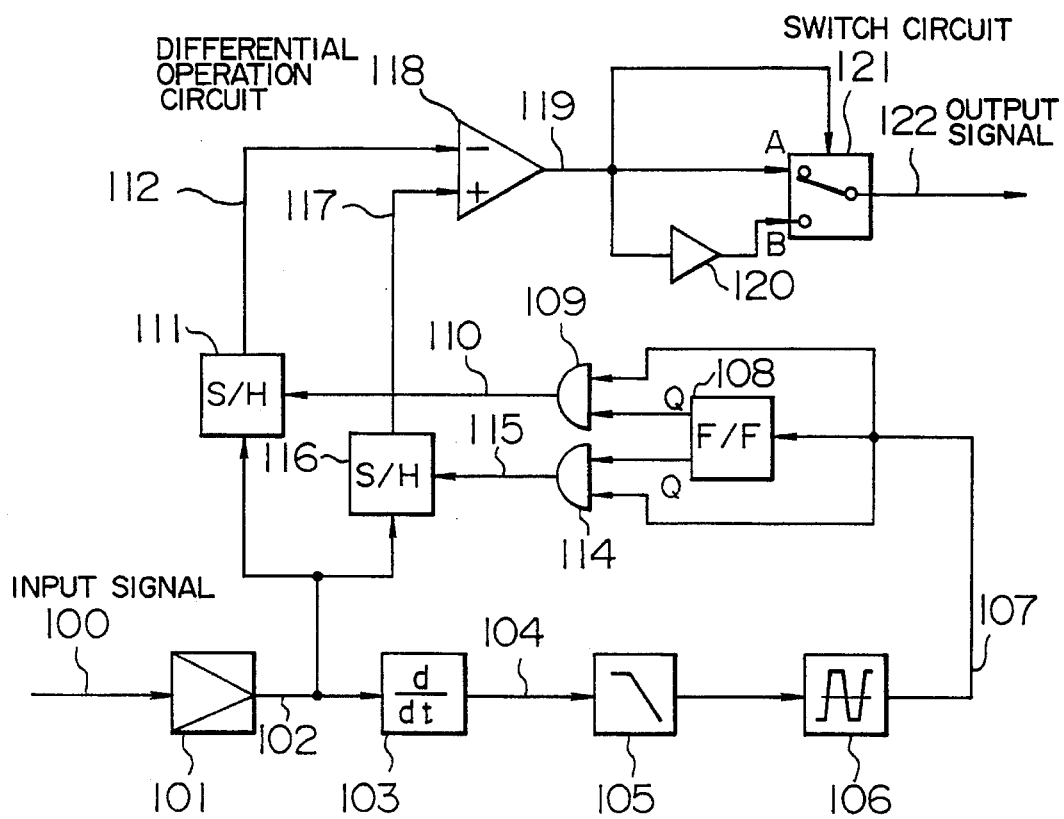
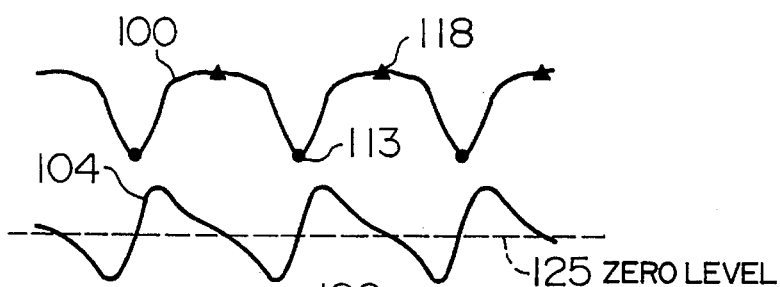
FIG. 6A
FIG. 6B
FIG. 6C
FIG. 6D
FIG. 6E

F I G. 14A 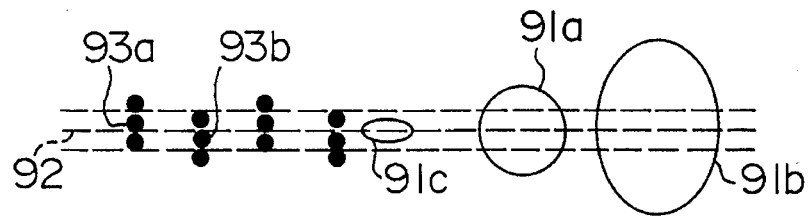
F I G. 14B 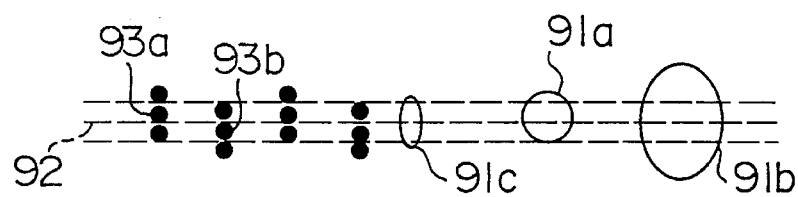
F I G. 14C 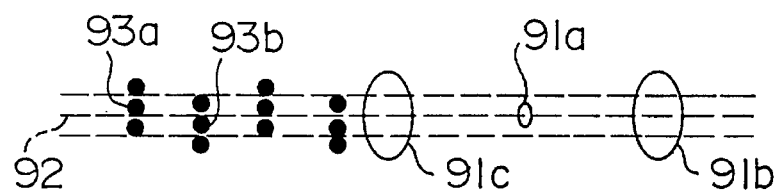
F I G. 14D 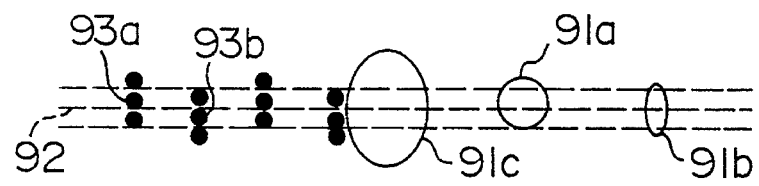
F I G. 14E 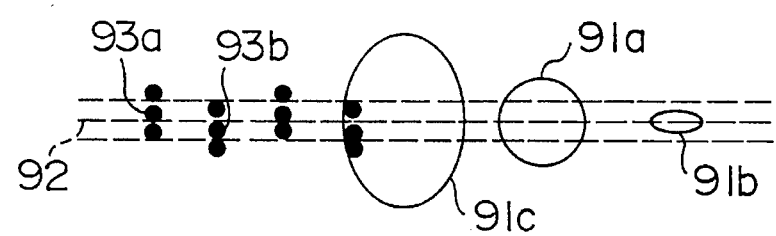
F I G. 15 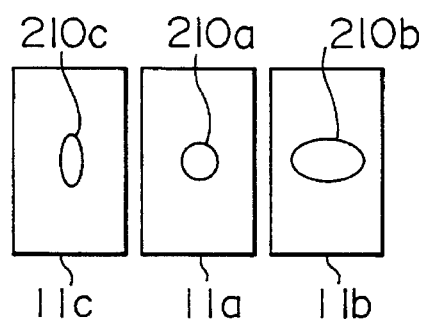

F I G. 17
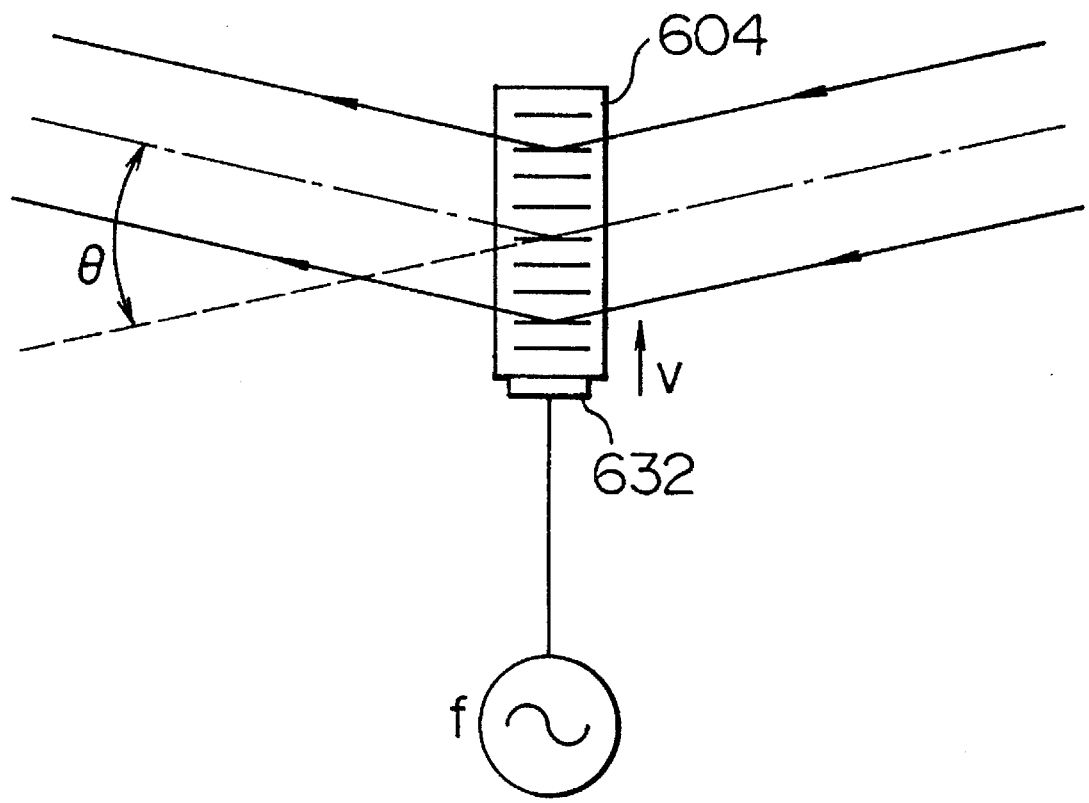

FIG. 22A
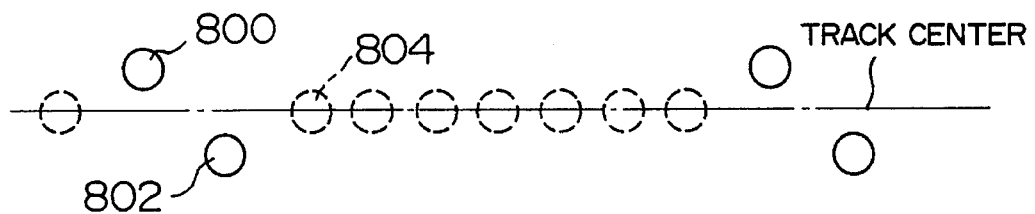
FIG. 22B
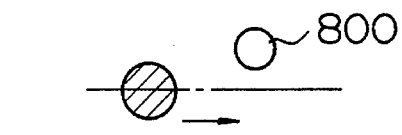
FIG. 22C
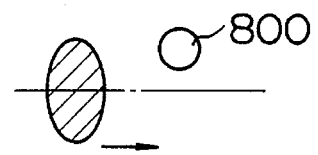
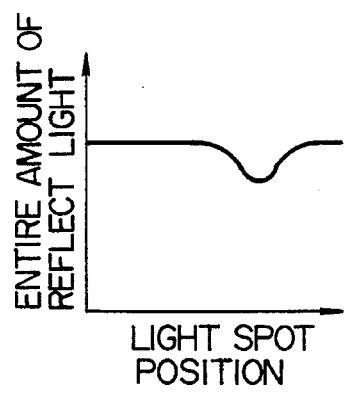
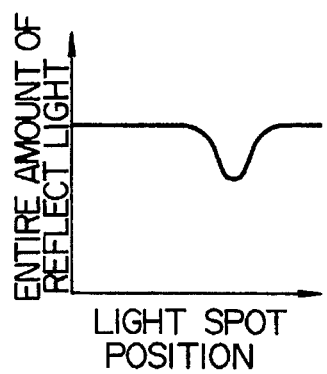
FIG. 22D
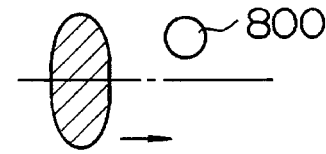
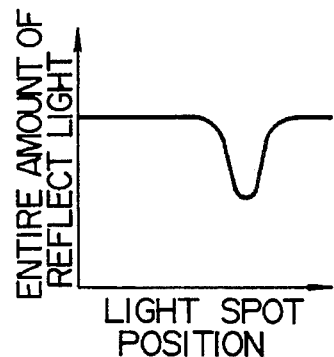

FOCUS ERROR DETECTING METHOD AND OPTICAL HEAD USING THE SAME

This application is a continuation-in-part of U.S. patent application Ser. No. 406,735, filed Sep. 13, 1989, now U.S. Pat. No. 5,396,477, the contents of which are incorporated herein by reference.

BACKGROUND OF THE INVENTION

The present invention relates to a focus error (degree of out-of-focus) detecting method and an optical head using it, and more particularly to a focus error detecting method which can easily adjust the position of an optical component and an optical head which can be used for an optical information processing device such as an optical disk device, an optical card device and an optical tape device.

An optical disk storage device has been developed as an information storage device which is adapted to be able to record, reproduce or erase data on a rotary recording medium with high density.

Most of the focus error detecting techniques adopted for the optical head in such an optical disk device are based on the fact that the shape or light intensity distribution of the light reflected from a disk varies in accordance with the focus error of the light. In this case, the light reflected from the disk is received by a multi-division photo-detector, and unbalance in the DC-like output signals is used as a signal for detecting the focus error.

For example, the astigmatical technique is disclosed in JP-A-53-19806 (first related art). If the beam reflected from a disk is given astigmatical by an astigmatical element such as a cylinder lens, it form two focal lines perpendicular to each other to provide a circular shape at the minimum confusion circle position in its rough center. Therefore, the reflected beam is received by the four-divided photo-detector located at the minimum confusion circle position. The shape of the reflected beam formed on the detection surface of the four-divided photo-detector is approximately circular if the disk is at the focal point. If the disk is displaced from the focal point, the shape of the reflected beam lines perpendicular to each other according to the direction of displacement. Thus, the DC-like output signals from photo-detector elements located at diagonal line positions of the four-divided photo-detector are added, and a difference between two DC-like added signals is taken to provide an out-of focus signal.

On the other hand, although in JP-A-1-303632 (second related art), changes in the shape and light intensity distribution of the light reflected from the disk are detected by the multi-division photo-detector, a focus error is not detected by detecting unbalance in the DC-like output signals resulting therefrom, but detected using a diffraction grating which forms light spots at different positions in a focus depth direction.

In an embodiment described in this JP-A-1-303632, the diffraction grating constitutes a part of a plurality of coaxial circle grooves in which the interval between the grating grooves are gradually increased or decreased, and gives aberration of longitudinal shift of an image point (aberration of focus) to a + first-order beam and an − first-order beam. Also, using an area where the center of the concentric circle grooves is eccentric from the main axis of a main beam, the diffraction grating emits the + first-order beam and the − first-order beam in opposite directions with respect to the main axis of the main beam. Thus, the + first-order beam and − first-order beam are focused by an objective lens as two side spots at different positions in the focus depth direction with respect to the main beam. The amounts of reflection light of the two side spots are modulated by signals recorded on an optical disk. The modulation degrees thus obtained are detected by a photo-detecting element and an envelope detecting circuit. The modulation degrees due to the two side spots vary in the focus error of the optical disk so that a difference therebetween is calculated to provide a focus error detecting signal.

The above related arts involves the following problems.

In the first related art, the target point in the focus error detecting optical system must be set so that a disk position where a data signal or the like is largest, or the amount of reflected light is maximum must be detected by an adjustment measuring system which is separately provided from a focusing system. And positions of the four-divided photo-detector and a detecting lens must be adjusted so that the focus error detecting signal is at a zero level because at the above disk position, each of the detecting elements of the four-divided photodetector receives an equal amount of light reflected from the disk and so produces a D.C. signal at the same level. Therefore, it takes a long time to assemble the optical head and adjust it; the optical head thus fabricated is very expensive. Further, the optical head must be provided with a mechanism for adjusting optical components with high accuracy so that it is difficult to realize a small-sized optical head. Moreover, if the positions of attaching the optical components are deviated from their normal position owing to a temperature change, the position of the reflected light on the detecting surface of the four-divided photo-detector will also vary. Then, DC-like unbalance occurs among the outputs from the respective detecting elements of the four-divided photo-detector so that the disk position where the focus error detecting signal is at a zero level does not align with the target position for focusing. As a result, the focus error detecting signal will involve an offset (detecting error).

Further, in the waveguide type optical head which is considered to be one type of the optical head to be realized in the feature, the beam which can travel within the waveguide has one-dimensional distribution. Therefore, few conventional focus error detecting systems using a change in the beam shape can be applied to the waveguide type optical head. Furthermore, in the waveguide type optical head, lens elements and photo-detecting elements are integrally fabricated on a waveguide substrate through a crystal growth process so that the positions of these elements cannot be shifted for focusing adjustment.

On the other hand, the above second related art can solve the above problems involved in the first related art. However, this second related art does not sufficiently study an arrangement of pits which permits a focus error signal to be obtained in a stabilized manner and the structure of a diffraction grating for defining the shape of side spots. Therefore, the operation for focusing control becomes unstable because of reduction in the modulation ratio due to a change in the relative position between the side spots and the pits in the radial direction of the optical head. Generally, automatic focusing control should be made prior to automatic tracking control, and must not be affected by the position change in the radial direction of the optical disk. This will be explained in detail with reference to FIGS. 27A, 27B and 27C.

In FIGS. 27A and 27B, 200a is a main spot on the surface of an optical disk; 200b and 200c are sub-spots on the optical disk surface; 201 is a track; and 202 are pits recorded on the track 201. It is assumed in both FIGS. 27A and 27B that the position of the optical disk in the direction of focal depth is deviated from the focal point of the main spot and the deviation is smallest at the position of the sub-spot 200c having the smallest area (i.e. the optical disk is located in the neighborhood of the focal point of the sub-spot 200c).

FIG. 27A shows the case where the above three spots travel rightly along the center of the track 201. In this case, the reflection light of the sub-spot 200c is modulated by the pit 202. Although not shown, if the optical disk is deviated in the direction opposite to the above case, and hence the area of the sub-spot is smallest, the reflection light of the sub-spot 200b will be modulated by the pit 202. Thus, if the above three spots travel rightly along the center of the track 201, the resulting focus error detecting signal will have the curve indicated by a solid line 203 in FIG. 27C.

On the other hand, FIG. 27B shows the case where the above three spots travel along the line deviated from the center of the track 201. In this case, the reflection light of the sub-spot 200c is not so greatly modulated by the pit 202, but the degree of modulation will be decreased to e.g. half or less in the case of FIG. 27A. Although not shown, also in the case the optical disk is deviated in the direction opposite to the above case, and hence the area of the sub-spot is smallest (i.e. the optical disk is located in the neighborhood of the sub-spot 200b), the degree of modulation of the reflection light of the sub-spot 200b will be decreased to half or less in the case of FIG. 27A. Thus, if the three spots travel along the line deviated from the center of the track 201 as in FIG. 27B as indicated by a broken line 204 in FIG. 27C the peak of the resulting focus error detecting signal will be reduced to half or less as compared with the curve 203, and so the detecting sensitivity in the neighborhood of the focal point will be reduced to half or less. Namely, if in this related art, the optical disk is deviated from the focal point of the main spot, it will approach the focal point of the sub-spot 200b or 200c and so the sub-spot will be confined into a small area. Then, the reflection light of the confined sub-spot, if the confined spot is deviated from the center of the track 201, will not be sufficiently modulated by the pit 202.

If the detection sensitivity is low in the pull-in operation into the automatic focusing control, driving force of causing an objective lens to follow the deviation of the optical disk will run short. As a result, the movement of the objective lens becomes slow so that the pull-in operation into the focusing control may end in failure. In this way, the second related art has a defect of making the pull-in operation into the focusing control unstable.

On the other hand, in automatic tracking control, a target can be automatically set to follow a track. And in order that in the automatic tracking control, no offset theoretically occur even when the positions of optical elements vary, a sample serve system using pre-wobbled pits has been proposed. In this sample serve system, an out-of-track is detected on the basis of the fact that when a main spot passes at least a pair of right and left pre-wobbled pits arranged with an equal amount of deviation from the track center, the modulation levels of the beams reflected from the right and left pre-wobbled pits vary in accordance with the degree of out-of-track (tracking error) of the main spot. The reflected beam is received by a photo-detector to detect the difference between the above modulation levels, thus providing an tracking error detecting signal. In this method, if the main spot travels along the track center, the tracking error detecting signal automatically becomes a zero level. This makes it unnecessary to adjust the positions of optical elements in order to set the target to follow the track. Further, the photo-detector has only to receive the entire amount of light of the reflected beam, and a change in the positions where optical components are attached will not provide any detecting error to the tracking error. However, in order to realize a small-sized optical head at low cost, both focus error and tracking error are detected in the same optical system and so both photo-detecting elements for detecting the focus error and the tracking error are incorporated in the same photo-detector package. Therefore, in assembling the optical head, it is not necessary to adjust the positions of the optical components for track-following target setting, but still necessary to adjust them at high accuracy for focusing. Thus, the above technique does not effect the merit of the sample servo system.

SUMMARY OF THE INVENTION

An object of the present invention is to provide a focus error detecting method capable of self-adjusting a target for focusing in which adjusting the positions of optical components is not required for focusing, and changes in the positions where the optical components are attached does not provide any detecting error to a focus error detecting signal, and also provide an optical head using this focus error detecting method.

Another object of the present invention is to provide a focus error detecting method in which a focus error signal detecting system is simplified and any offset is not generated owing to an error in initial adjustment in the focus error detecting system, a temperature change, a secular change, disk inclination, etc.

In order to attain these objects, there is provided a focus error detecting method comprising emitting a light beams from a light source, giving positive (+) astigmatism and negative (−) astigmatism to the beams emitted, focusing the beam supplied with the astigmatism onto an information recording surface, receiving the beams reflected from the information recording surface by photo-detecting elements, and comparing the beams with positive astigmatism and negative astigmatism received by the photo-detecting element to calculate a difference between therebetween, thus providing a focus error detecting signal.

Further, there is provided a focus error detecting method in which an information recording surface is used on which a large number of marks for modulating the amount of the reflection light of projected beams are intermittently located in a track traveling direction and these marks are aligned in the direction nearly perpendicular to the track traveling direction within a range of at least several tracks; in a focusing optical system including a diffraction element used to permit a part of the beam emitted from a light source as a main beam to pass and generate a pair of sub-beams having positive astigmatism and negative astigmatism in the direction different from the main beam at a minute angle, through the diffraction element, the main beam is focused on the information recording surface as a main spot whereas the pair of sub-beams are focused at the positions different from the main spot in the focal point direction and the track traveling direction; the beams reflected from the information recording surface are separately taken out from the optical path of the imaging optical system so that the reflection beams of the pair of sub-beams are received by two photo-detecting element; and the amplitudes of the reflection beams of the pair of sub-beams which are modulated by the marks are detected in terms of the outputs from the two photo-detecting elements, thereby providing a focus error detecting signal based on a difference therebetween.

Further, in accordance with the present invention, there is provided a focus error detecting method comprising the steps of emitting beams from a light source, supplying positive astigmatism and negative astigmatism to the beams by varying the frequency of an acoustooptic element, focusing the beams supplied with the astigmatism on an information recording surface, receiving the beams reflected from the information recording surface, and comparing the reflection beams with the positive astigmatism and the negative astigmatism to calculate a difference therebetween and providing a focus error detecting signal on the basis of the difference.

Further, in accordance with the present invention, there is provided an optical head for projecting beams on an information recording surface on which a large number of marks for modulating the amount of the reflection light of projected beams are intermittently located in a track traveling direction and these marks are aligned in the direction nearly perpendicular to the track traveling direction within a range of at least several tracks, comprising a light source; an imaging optical system including a diffraction element located on the optical path of the beams for permitting a part of the beam emitted from a light source as a main beam to pass and generate a pair of sub-beams having positive astigmatism and negative astigmatism in the direction different from the main beam at a minute angle, the imaging optical system for focusing the main beam on the information recording surface as a main spot while focusing the pair of sub-beams at the positions different from the main spot in the focal point direction and the track traveling direction; separated optics for taking out the beams reflected from the information recording surface separately from the optical path of the focusing optical system; photo-detecting means for receiving the reflection beams, at least including two photo-detecting elements for receiving the reflection beams of the pair of sub-beams, respectively; and a focus error detecting circuit for detecting the amplitudes of the reflection beams of the pair of sub-beams which are modulated by the marks in terms of the outputs from the two photo-detecting elements, thereby providing a focus error detecting signal based on a difference therebetween.

Further, in accordance with the present invention, there is provided an optical head comprising a light source for emitting a light beam, an imaging optical system including an acoustooptic element, located on the optical path of the beams emitted from the light source, for supplying positive astigmatism and negative astigmatism to the beam by varying the frequency of the acoustooptic element so that the beams are focused as spots on the information recording surface; separated optics for taking out the beams reflected from the information recording surface separately from the optical path of the imaging optical system; photo-detecting elements for receiving the reflected beams thus separated; an acoustooptic element driving circuit for varying the frequency of the acoustooptic element; a focus error detecting circuit for comparing the reflection beams with positive astigmatism and negative astigmatism received by the photo-detecting means to calculate a difference therebetween and producing a focus error detecting signal on the basis of this difference; and a control circuit for controlling the imaging optical system on the basis of the focus error detecting signal and focusing the beams at the focusing position on the information recording surface.

In the present invention, the beams emitted from the light source are given astigmatism by a device for giving the astigmatism, and focused on the surface of an optical disk. Thereafter, the beams reflected from the optical disk surface are detected by photo-detectors to detect a focus error. A diffraction grating or an acoustooptic element is used as the device for giving the astigmatism. Now referring to the drawings, an explanation will be given of the theory of the focus error detecting method using the diffraction grating or the acoustooptic element.

A. Focus error detecting method using the diffraction grating

Referring to FIG. 11, the theory of the method of detecting a focus error using the diffraction grating will be explained. FIG. 11 shows the basic arrangement of an optical head in accordance with the present invention. In FIG. 11, a laser beam flux emitted from a semiconductor laser 1 is separated into a zero-order beam 4a, a + first-order beam 4b and a − first-order beam 4c by a diffraction grating 3. The ± first-order beams 4b and 4c emit in the direction different from the zero-order beam 4a by positive and negative minute angles. The diffraction grating 3 used in the present invention, which is a non-equidistant straight groove diffraction grating or a concentric elliptical diffraction grating unlike a normal equidistant straight groove diffraction grating, serves as a positive cylinder lens or tholoidal lens for the + first-order beam 4b and serves as a negative cylinder lens or tholoidal lens for the − first-order beam. Thus, the + first-order beam 4b and the − first-order beam 4c are given positive and negative astigmatism with equal absolute values, respectively. The diffraction grating 3 places, at least in the direction of paper face, the + first-order beam 4b in a more converged state than the zero-order beam 4a and the − first-order beam 4c in a more diverged state than the zero-order beam 4a. The respective beams, after having passed through a beam splitter 5, are condensed or converged by a focus lens 6. It is assumed that in the direction of paper face, the focus of the zero-order beam 4a is 7a, that of the + first-order beam 4b is 7b and that of the − first-order beam 4c is 7c; it should be noted that focuses 7b and 7c are focal lines of the + first-order beam 4b and − first-order beam 4c. The zero-order beam 4a, the + first-order beam 4b and the − first-order beam 4c are reflected from an optical disk 8 as beams 10a, 10b and 10c, respectively. These reflection beams 10a, 10b and 10c, after having passed through the focus lens 6, are reflected from the beam splitter 5 and reach photo-detecting elements 11a, 11b and 11c, respectively. Thus, the photo-detecting element 11a receives the zero-order reflection beam 10a, the photo-detecting element 11b receives the + first-order reflection beam 10b thereby to produce a light amount signal 12b, and the photo-detecting element 11c receives the − first-order reflection beam 10c thereby to produce a light amount signal 12c. Meanwhile, the optical disk 8 has marks such as rugged pits. Therefore, if the optical disk 8 moves in a transverse direction on the paper face, the light amounts of the + first-order reflection beam 10b and − first-order reflection beam 10c will be modulated owing to the pits, i.e. the levels of these reflection beams will be changed. Thus, the light amount signals 12b and 12c will be modulated. The ratios of modulation in the light amount signals 12b and 12c can be detected by e.g. envelope detection circuits 13b and 13c. Each of the envelope detection circuits 13b and 13c serves to detect the upper and lower levels of an input light amount signal to produce a difference therebetween, i.e. the degree of modulation in the input light amount signal. Thus, a modulation ratio signal 14b represents the ratio of modulation in the + first-order reflection beam 10b due to the marks whereas a modulation ratio signal 14c represents the degree of modulation in the − first-order reflection beam 10c due to the marks. The modulation ratio signals 14b and 14c are supplied to a differential operational circuit 15 which in turn produces a focus error detecting signal 16 as its output.

The most suitable position (position of a target for focusing) of the optical disk 8 to record/reproduce information using the zero-order beam 4a is a position 9(2) which is the focus of the zero-order beam 4a. The degrees of astigmatism given to the + first-order beam 4b and − first-order beam 4c by the diffraction grating 3 are opposite in their polarity and equal in their absolute value. Therefore, the degrees of deviation of the focuses 7b and 7c from the optical disk 8 are equal. Therefore, at such a position of the optical disk 8, the degrees of modulation in the + first-order beam and − first-order beam are equal so that the levels of the light amount signals 14b and 14c are equal. Thus, the focus error signal 16 is at a zero level.

Now if the optical disk 8 shifts toward a position 9(1), the modulation degree of the + first-order reflection beam 10b will be increased and that of the − first-order reflection beam 10c will be decreased. Thus, the focus error signal 19 will have a positive level. If the optical disk 8 is located at the position 9(1) of the focus 7b of the + first-order beam 4b, the modulation degree of the + first-order reflection beam 10b will reach its maximum; thus, the focus error detecting signal 16 will have a maximum positive level.

On the other hand, if the optical disk 8 shifts toward a position 9(3), the modulation ratio of the + first-order reflection beam 10b will be decreased and that of the − first-order reflection beam 10c will be increased. Thus, the focus error signal 19 will have a negative level. If the optical disk 8 is located at the position 9(3) of the focus 7b of the − first-order beam 4c, the modulation ratio of the + first-order reflection beam 10c will reach its maximum; thus, the focus error detecting signal 16 will have a maximum negative level.

FIGS. 12A and 12B show the face of the optical disk 8 when the disk 8 has shifted to the position of 9(3). In FIGS. 12A and 12B, 210a is a main spot on the surface of an optical disk; 210b and 210c are sub-spots on the optical disk surface; 211 is a track; and 212a to 212l are pits recorded on the track 212. It is assumed that the positions of the pits 212 are aligned over several tracks in the radial direction of the disk, more specifically, pits 212a to 212c, 212d to 212f, 212g to 212i and 212j to 212l are aligned in the radial direction of the disk, respectively.

FIG. 12A shows the case where the above three spots travel rightly along the center of the track 201. In this case, the reflection light of the sub-spot 210c is modulated by the pits 212j to 212l. Although not shown, if the optical disk 8 is deviated to the position of 9(1), the reflection light of the sub-spot 210b will be modulated by the pits 212j to 212l. Thus, if the above three spots travel rightly along the center of the track 201, the resulting focus error detecting signal 16 will have the curve indicated by a solid line 213 in FIG. 12C.

On the other hand, FIG. 12B shows the case where the above three spots travel along the line deviated from the center of the track 201. In this case also, the reflection light of the sub-spot 200c is greatly modulated by the pits 212j and 212k, so that the ratio of modulation obtained is not almost decreased to be approximately equal to that in the case of FIG. 12A. Although not shown, also in the case the optical disk 8 is deviated to the position of 9(1), the reflection light of the sub-spot 210b is modulated by the pits 212j and 212k so that the degree of modulation is not almost decreased to be approximately equal to that in the case of FIG. 12A.

Thus, even if the three spots travel along the line deviated from the center of the track 201, the resulting focus error detecting signal has the level approximately equal to the solid line 213, as indicated by a broken line 214 in FIG. 12C. Therefore, the peak of the resulting focus error detecting signal and the detecting sensitivity in the neighborhood of the focal point will not be reduced. For this reason, even if the above track error occurs, the pull-in operation into the automatic focusing control can be performed in a stabilized manner.

As described above, the degrees of astigmatism given to the + first-order beam 4b and the − first-order beam 4c by the diffraction grating 3 are opposite in their polarity and equal in their absolute value. Therefore, if the optical disk 8 is located at the target point for focusing, the degrees of deviation of the focuses 7b and 7c from the optical disk 8 are necessarily equal. Thus, at such a position of the optical disk 8, the degrees of modulation in the + first-order beam and − first-order beam due to the marks (pits) are equal so that the focus error signal 16 is automatically set for a zero level. In this way, the target point for focusing can be automatically set so that it is not necessary to adjust the positions of optical elements for the purpose of focusing. Further, as shown in FIG. 15, the photo-detectors 11b and 11c have only to receive the entire amount of light of the spot 210b due to the + first-order reflection beam 10b and the spot 210c due to the − first-order reflection beam 10c, respectively, and hence the respective reflection beams may be located at any position of the photo-detectors. Accordingly, changes in the positions of the optical components will not theoretically produce any detecting error. Also, occurrence of the tracking error will not hinder the pull-in operation into the automatic focusing control from being made in a stabilized manner.

B. Detecting method using an acoustooptic element

The optical disk device using an acoustooptic element is disclosed in U.S. Ser. No. 406,735. In order to execute the seek operation (access operation) for selecting a track at a high speed, this disk device is provided the acoustooptic element with no mechanical movable section. This device adopts a so-called differential detecting system in which the light reflected from a disk is focused by a convex lens to detect focus error, and a photo-detector is located before and after the focus to take a difference between detected signals.

On the other hand, in the present invention, the acoustooptic element used to precisely position a light spot is also used as means for detecting the focus error.

As described in U.S. Ser. No. 406,735, the acoustooptic element serves to deflect light at a high speed using refraction of light due to a change in the refractive index generated by the sonic wave propagating through a crystal. The acoustooptic element may be a bulk crystal or a thin-film crystal using a surface elastic wave propagating its surface.

The acoustooptic element is usually driven at the frequency of several tens MHz to several hundreds MHz. Incident light flux is given astigmatism by varying the driving frequency. By increasing or decreasing the frequency, the focal line of the axis supplied with astigmatism can be moved in both directions from the original focus position. If the light spot located in an in-focus condition is given astigmatism, its shape changes into an ellipse.

In the first embodiment using the acoustooptic element, the driving frequency for the acoustooptic element is varied to provide the astigmatism thereby to move the focus in both directions. The shape of the light spot thus formed is used to detect focus error.

In the second embodiment using the acoustooptic element, with pits arranged apart from a track center, an elliptical light spot is passed on track. The driving frequency of the acoustooptic element is changed to provide astigmatism thereby to move the focus in both directions. Then, the light spot will move on the pits. The amount of reflection at this time is used to detect the focus error.

The third embodiment using the acoustooptic element is a combination of the first and second embodiment.

Now referring to the drawings, an explanation will be given of the theory of the focus error detecting method using an acoustooptic element in accordance with the present invention.

As shown in FIGS. 18A and 18B, if the driving frequency for the acoustooptic element is changed, the interval of the compression distribution of the refractive index within the crystal will be changed. Therefore, incident parallel or collimated light is emitted from the crystal as converged light or diverged light. It should be noted that the emitted light in the direction perpendicular to paper face remains the parallel light.

The converged light or diverged light incident to a lens provides astigmatism. Therefore, the shape of the light spot formed in the neighborhood of the focal distance of the lens will be changed from a circle into an ellipse as shown in FIG. 20. This applies to both converging lens for an optical disk and focusing lens for a photo-detector.

If the shift amount of a focal line due to astigmatism is the same, the shape of an ellipse at the position of the focal distance remains unvaried regardless of incidence of the converged light or diverged light. However, at the position deviated from the focal distance, the shape of the light spot formed varies in accordance with the converged light or diverged light. A focus error signal is obtained by detecting a difference in the shape of the light spot.

In the first embodiment using an acoustooptic element, application of astigmatism changes the shape of the light spot on a photo-detector into an ellipse which is used to detect the focus error detecting signal. A three-divided photo-detectors shown in FIGS. 21A and 21B is used to take the sum of the light amounts at both ends of the elliptical light spot in its major axis direction. If the optical disk is located at the focus of an objective lens, the sum of the light amounts remains unvaried regardless of the converged light or diverged light. On the other hand, if the optical disk is located at the position deviated from the focus, the sum of the light amounts varies to provide a difference between the cases the incident light is converged light and diverged light. The difference is used to detect the focus error signal.

In the second embodiment using an acoustooptic element, application of astigmatism changes the shape of the light spot on an optical disk into an ellipse which is used to detect the focus error signal. Specifically, with servo-pits 800 and 802 arranged apart from a track center, an elliptical light spot is moved on the track. The amount of reflection light generated at this time decreases by the amount according to the shape of the light spot as shown in FIGS. 22B to 22D. If the optical disk is located at the focus of an objective lens, the decreased amount in the reflection light remains unvaried regardless of the converged light or diverged light. On the other hand, if the optical disk is located at the position deviated from the focus, the decreased light amount varies to provide a difference between the cases the incident light is converged light and diverged light. The difference is used to detect the focus error signal.

In the third embodiment using an acoustooptic element, the signal at a higher frequency band is detected in the first embodiment while the signal at a lower frequency band is detected in the second embodiment to enhance the detecting sensitivity, thereby suppressing detecting error in the focus error signal.

BRIEF DESCRIPTION OF THE DRAWINGS

These and other objects and advantages of the present invention will become apparent by reference to the following description and accompanying drawings wherein:

FIG. 5 is a block diagram of the envelope detecting circuit in FIG. 2;

FIGS. 6A to 6E are views for explaining the operation of the envelope detecting circuit in FIG. 5;

FIGS. 14A to 14E are views for explaining the structure and function of a concentric elliptical diffraction grating of FIGS. 13A and 13B;

FIG. 15 is a view showing the state where a beam is focused on an acoustooptic element;

FIG. 17 is a view showing the basic operation of the acoustooptic element;

FIGS. 22A to 22D are views for explaining the operation theory of the second embodiment using the acoustooptic element;

DESCRIPTION OF THE PREFERRED EMBODIMENTS

Figure 1:
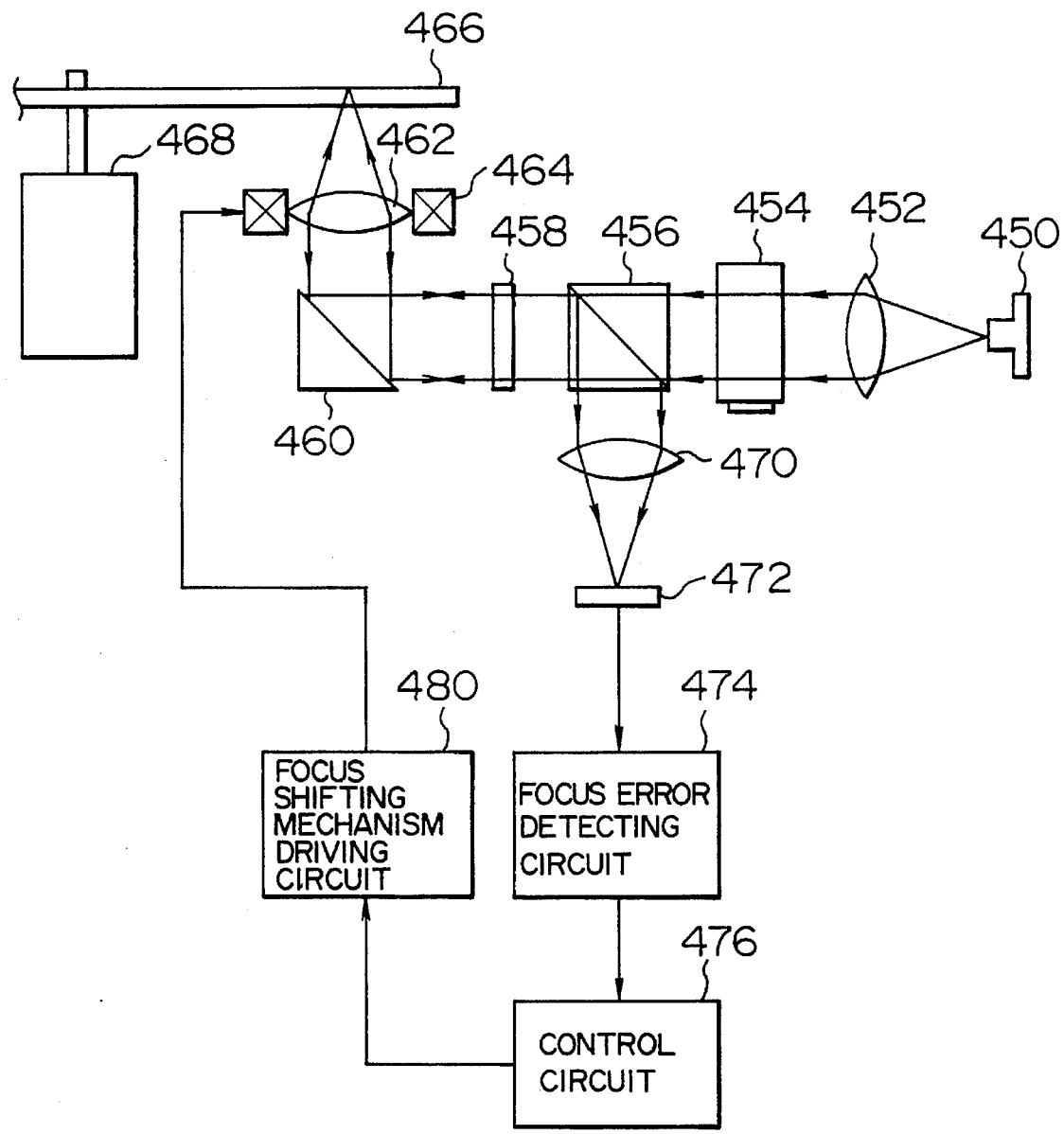
FIG. 1 is a block diagram showing the entire arrangement of an embodiment of the present invention provided with means for applying astigmatism.

Now referring to the drawings, an explanation will be given for several embodiments of the present invention.

FIG. 1 shows an arrangement of an optical disk device provided with means for supplying astigmatism according to the present invention. In FIG. 1, the light emitted from a laser diode 450 is converted into a collimated beam by a collimating lens 452, and a directed to an astigmatism supplying device 454. The astigmatism supplying device 454 supplies positive and negative astigmatism with longitudinal shift of an image point (i.e. focus error) to the beam. Thus, the light beam with the astigmatism is directed to a polarized light beam splitter 456. Since the polarization of the light beam is selected to be S polarized light with respect to the polarized beam splitter, a large part of the light beam passes straight through the polarized beam splitter. The light beam emerging from the polarized beam splitter 456 is converted into circularly polarized light beam through a λ/4 plate 458 and it is projected onto an optical disk 466 through a reflecting mirror 460 and a converging lens 462, thereby focusing a light spot on the optical disk 466.

The light reflected from the optical disk 466 is again passed through the converging lens 462 and the reflecting mirror 460 and the λ/4 plate 458 and again the light beam is restored to linearly polarized light by the λ/4 plate 458. Then, the polarized light takes the form of S polarized light to the polarized light beam splitter 456 so that it is not passed through but reflected from the polarized light beam splitter 456. The reflected light beam is converged on a photodetector element 472 through a focusing lens 470.

A focus error detecting circuit 474 compares the light spots with positive and negative astigmatism received by the photo-detector 472 to take a difference therebetween and detects a focus error on the basis of this difference to produce a focus error detecting signal. A control circuit 476 serves to drive the converging lens 462 by a focus shifting mechanism 464 through a focus shifting mechanism driving circuit 480 so that the light spot is focused on the optical disk 466.

An explanation will be given of the embodiments in which a diffraction grating or an acoustooptic element is used as the astigmatism supplying device.

A. Embodiments using the diffraction grating

Now referring to FIGS. 2 to 10, an explanation will be given of the first embodiment of the method for detecting a focus error using a diffraction grating.

Figure 2:
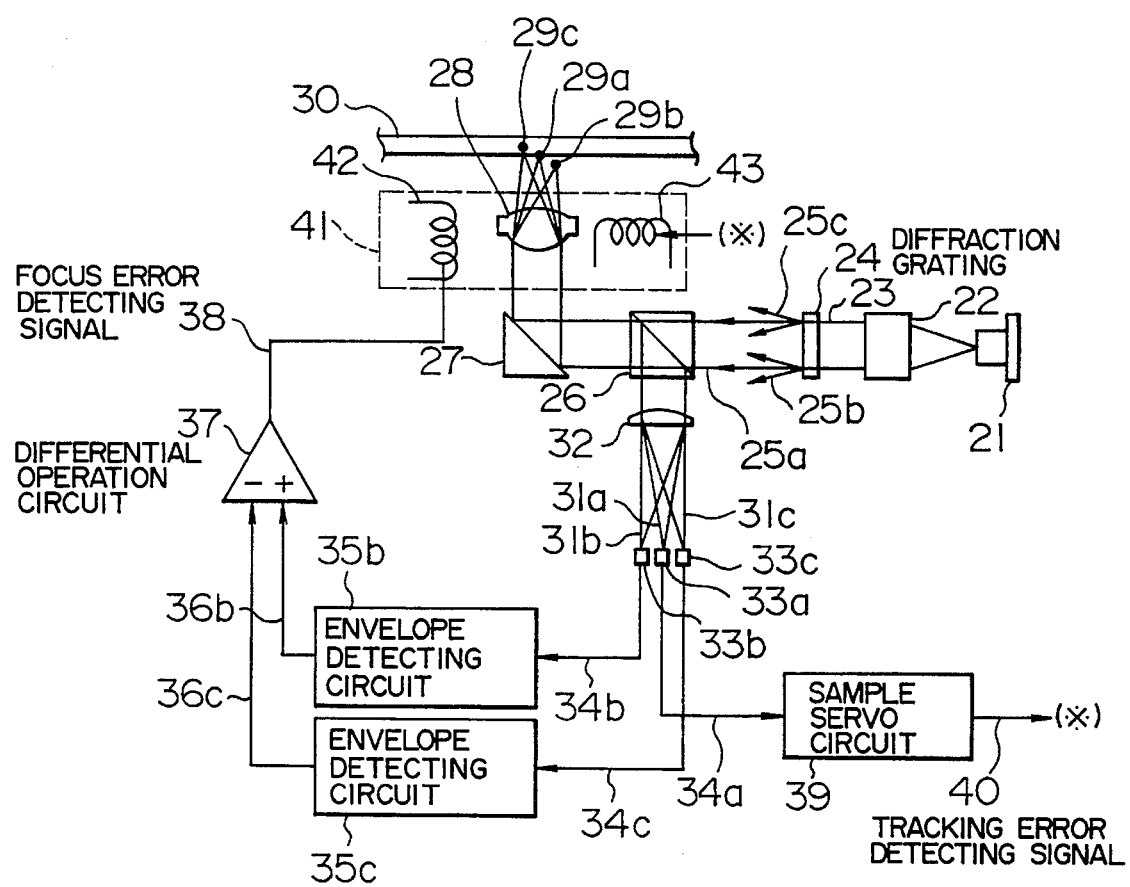
FIG. 2 is a block diagram of the entire arrangement of an embodiment in which a diffraction grating is used as means for applying astigmatism.

FIG. 2 shows an embodiment of an optical disk according to the present invention which is illustrated for convenience of explaining the method of detecting a focus error. In FIG. 2, 21 is a semiconductor laser which emits a laser beam with the wavelength of e.g. 780 nm.

The laser beam emitted is projected onto an optical disk 30 through a focusing optical system. 22 is a collimator lens which converts the laser beam emitted from the semiconductor laser 21 into a parallel (collimated) light beam 23 having a diameter of 5 mm. 24 is a non-equidistant straight groove pitch diffraction grating with an effective area of 5 mm square. The diffraction grating 24, on which linear groove are arranged to be perpendicular to paper face, separates the collimated beam 23 into a zero-order beam 25a, a + first-order beam 25b and a − first-order beam 25c and diffracts the ± first-order beams 25b and 25c in the direction of ±0.745°. Also the diffraction grating 24 serves as a positive cylinder lens with a focal distance of +3000 mm for the + first-order beam 25b to give positive astigmatism to it, and serves as a negative cylinder lens with a focal distance of −3000 mm for the − first-order beam 25c to give negative astigmatism to it. Each of the beams passes through a beam splitter, reflected by a mirror 27 and focused by a focusing lens 28. The focusing lens 28 has a focal distance f0 of e.g. 3 mm and a numerical aperture NA of e.g. 0.55. The zero-order beam 25a is focused on a focal point 29a. The + first-order beam 25b, which has positive astigmatism, is focused on a focal line 29b at the position near to the focusing lens 28. The − first-order beam 25c, which has negative astigmatism, is focused on a focal line 29c at the position far from the focusing lens 28.

The optical disk 30 has a diameter of e.g. 5 inch and is formatted for sample servo. Spirally formed on the recording face of the optical disk, 30 is a track (recording area) with a track pitch of 1.5 μm. One round of the track is divided into 32 sectors each divided into 43 segments; at the start of each segment, at least a pair of pre-wobble pits 93a and 93b are arranged at the positions deviated right and left from the track center by ¼ track (see FIGS. 7A to 7C).

The zero-order beam 25a, the + first-order beam 25b and the − first-order beam 25c are reflected by the optical disk 30. The corresponding reflection beams 31a, 31b and 31c are passed through the focusing lens 28, reflected by the mirror 27, and further reflected by the beam splitter 26 to be separated from the beams projected onto the optical disk 30.

The reflection beams thus separated are converged by e.g. a convex lens 32 to be directed to a detecting optical system. 33a is a photo-detecting element for receiving the zero-order reflection beam 31a which produces a light amount signal 34a proportional to the light amount of the zero-order reflection beam 31a. 33b is a photo-detecting element for receiving the + first-order reflection beam 31b which produces a light amount signal 34b proportional to the light amount of the + first-order reflected beam 31b. 33c is a photo-detecting element for receiving the − first-order reflection beam 31c which produces a light amount signal 34c proportional to the light amount of the − first-order reflection beam 31c. Meanwhile, the optical disk 30 is rotated (i.e. moves in the direction perpendicular to paper face) at the speed of e.g. 2400 rpm by a motor (not shown) so that the respective light amounts of the zero-order reflection beam 31a, the + first-order reflection beam 31b and the − first-order reflection beam 31c are modulated, and hence the light amount signals 34a, 34b and 34c from the photo-detecting elements 33a, 33b and 33c are also modulated, respectively.

35b and 35c are envelope detecting circuits. The envelope detecting circuit 35b detects the modulation ratio of the + first-order reflection beam 31b to produce a modulation ratio signal 36b whereas the envelope detecting circuit 35c detects the modulation ratio − first-order reflection beam signal 31c to produce a modulation ratio signal 36c. 37 is a differential operation circuit which makes subtraction between the modulation signals 36b and 36c to produce a focus error detecting signal 38. 39 is a sample servo circuit which produces a tracking error detecting signal 40 on the basis of the light amount signal 34a for the zero-order reflection beam 31a. 41 is a two-dimensional lens actuator which comprises an AF driving mechanism 42 having a coil and a magnet for shifting the focusing lens 28 in its optical axis direction, and a TR driving mechanism 43 having a coil and a magnet for shifting the focusing lens 28 in the radial direction of the disk.

Figure 3A:
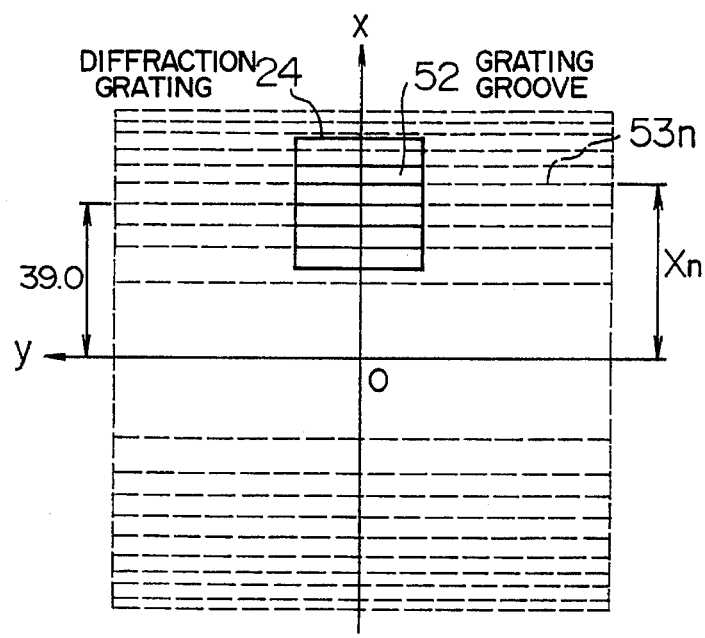
FIGS. 3A and 3B are views for explaining the structure and function of a straight groove diffraction grating.
Figure 3B:
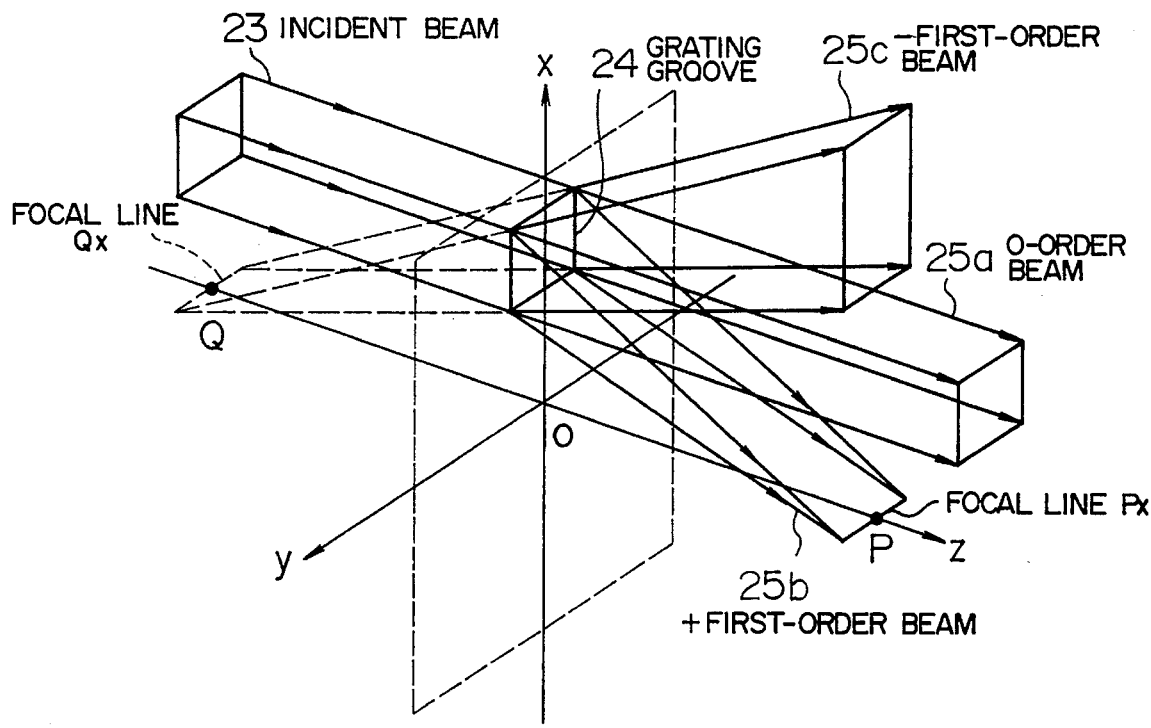

Now referring to FIGS. 3A and 3B, and FIG. 4, an explanation will be given of the structure and function of a non-equidistant straight groove pitch diffraction grating 24. An x-axis and a y-axis are taken in the plane including the diffraction grating 24, a z-axis is taken in the traveling direction of the beam, and the origin of the coordinate in design is taken as O. FIG. 3A shows an x–y plane. A large number of grating grooves 52 are part of a group of lines 53n (n=±1, ±2, ±3, . . . ). Since the function of the diffraction grating are uniform in the y-axis direction, its function will be explained using the x–z plane shown in FIG. 4.

Figure 4:
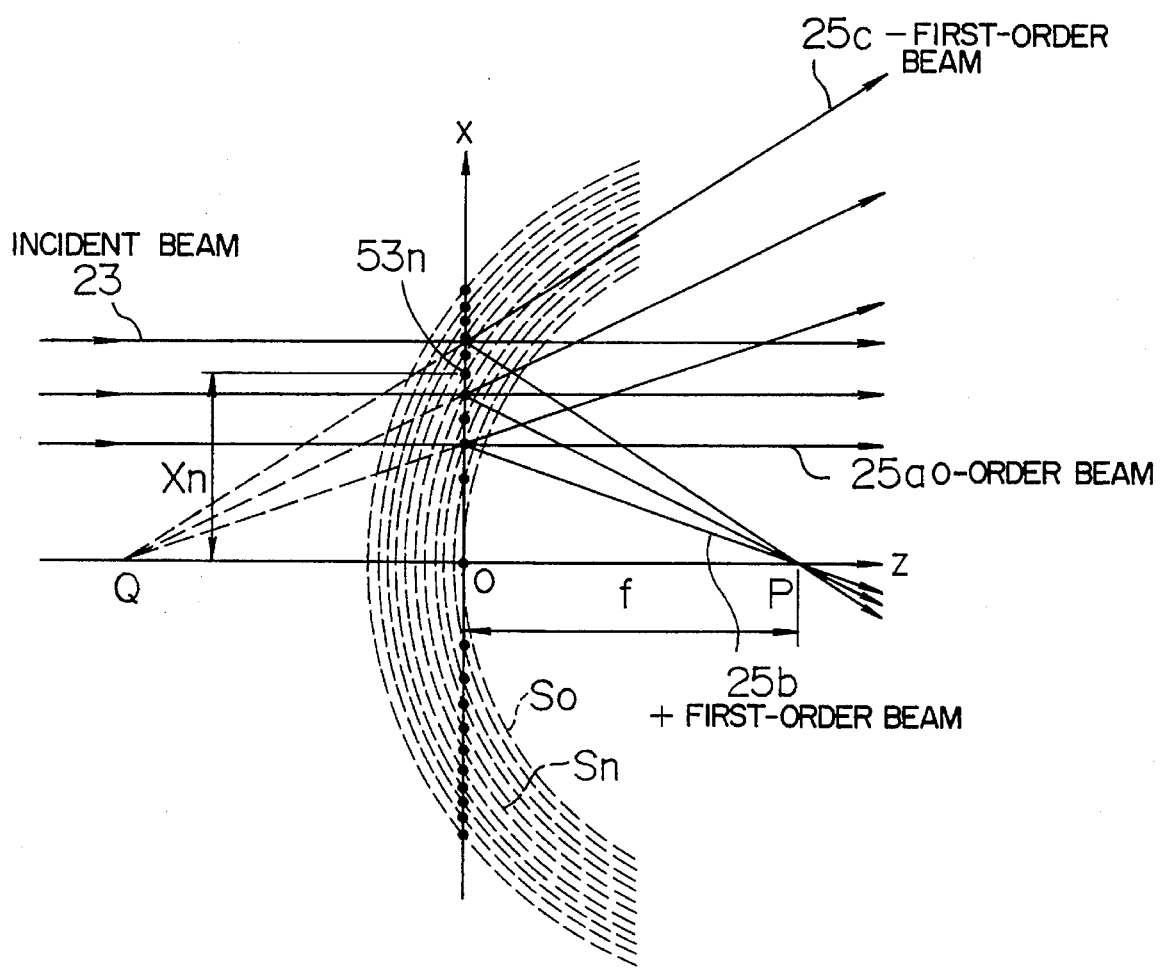
FIG. 4 is also a view for explaining the structure and function of the straight groove diffraction grating of FIGS. 3A and 3B.

In FIG. 4, the point on the z-axis apart from the origin O by f is represented by P, and a circle with a diameter f having a center of the point P is represented by SO. Assuming that the wavelength of the beam 23 is λ, the circles each with a diameter of (f+nλ) having a center of the point P are represented by Sn (n=1, 2, 3, . . . ). It is assumed that intersection points of the circles Sn and the x-axis are a group of lines 53n. The beam incident on the x–y plane are diffracted by the group of lines 53n. Then, the beam converging at the point P, which are in the same phase at the point and strengthened by each other, result in + first-order beam. On the other hand, the beam which diffracted by the group of lines 53n in the direction opposite to the + first-order beam 25b result in − first-order beam 25c diverging from the point G on the z-axis apart from the origin O by − f because of symmetry of the diffraction angle of the diffraction grating. Thus, as shown in FIG. 3B, the non-equidistant straight groove pitch diffraction grating 24 serves as a positive cylinder lens having a focal distance of f for the + first-order beam 25b to supply positive astigmatism to them; the + first-order beams are focused on a focal line Px. In contrast, the diffraction grating 24 serves as a negative cylinder lens having a focal distance of − f for the − first-order beam 25c to supply negative astigmatism to them; the − first-order beams 25c result in the beam diverging from a focal line Qx.

As shown in FIG. 4, the distance Xn of the n-th grating groove 52 from the origin O can be expressed by $$Xn = \sqrt{\{(f+n\lambda)^2 - f^2\}}$$

Therefore, by substituting the focal distance of f= 3000 mm of the cylinder lens and the wavelength λ=0.00078 mm (780 nm) for the above equation, any Xn can be calculated. On the other hand, assuming that the diffraction angle θ of ± first-order beams is ±0.745°, the center of the diffraction grating is located at the position of f×tan θ. If the size of the diffraction grating of 5 mm in taken in consideration, Xn is within the range of 39.5 mm ≦Xn≦41.5 mm. Xn calculated within this range are shown in Table 1. In Table 1, ΔXn denotes a grating groove pitch. The value thereof is 60.0 μm at the center of the diffraction grating, and decreased from 64.1 μm to 56.4 μm at a further position from the origin O.

TABLE 1

| n | Xn (mm) | ΔXn (mm) |
| --- | --- | --- |
| 368 | 41.50087 | |
| 367 | 41.44444 | 0.05643 |
| 366 | 41.38794 | 0.05650 |
| 365 | 41.33136 | 0.05658 |
| . . . | . . . | . . . |
| 327 | 39.12065 | |
| 326 | 39.06078 | 0.05987 |
| 325 | 39.00082 | 0.05996 |
| 324 | 38.94077 | 0.06005 |
| 323 | 38.88063 | 0.06014 |
| . . . | . . . | . . . |
| 287 | 36.64983 | |
| 286 | 36.58592 | 0.06391 |
| 285 | 36.52190 | 0.06402 |
| 284 | 36.45777 | 0.06413 |

The diffraction grating 24 can be fabricated by making a mask pattern of grating grooves on the basis of the data in Table 1 using an electron beam drawing device, exposing the photoresist on a glass substrate through the mask pattern using an exposure device, and thereafter making development.

Meanwhile, the group of lines 53n can be regarded interference fringes produced as a result of interference of the incident beam 23 with the beam converging on the focal line Px or diverging from the focal line Qx. Therefore, the diffraction grating 24 can be fabricated by the technique of making a hologram. Specifically, the diffraction grating 24 can be fabricated in such a manner that with a hologram photo-sensitive plate located on the x–y plane in FIG. 3B, on the photo-sensitive plate, the beam which are directly incident on the photo-sensitive plate like the incident beam 23 are caused to interfere with the beams converging on the focal line Px like the + first-order beam 25b, or the beams which are directly incident on the photo-sensitive plate like the incident beam 23 are caused to interfere with the beam diverging from the focal line Qx like the − first-order beam 25c.

Now referring to FIGS. 5 and 6A to 6E, an explanation will be given of the envelope detecting circuits 35b and 35c.

FIG. 5 is a block diagram of the envelope detecting circuit 35b or 35c. In operation, an input, signal 100 corresponding to the light amount signal 34b or 34c is amplified by an amplifier 101 and differentiated by an differentiation circuit 103. The high frequency noise of a differentiated signal from the circuit 103 is removed by a filter 105 and directed to a zero level comparator 106 with both polarities to provide a pulse signal 107.

FIG. 6A shows an example of the input signal 100; FIG. 6B shows its differentiated signal 104; FIG. 6C shows the pulse signal 107. In FIGS. 6A to 6E, the same time passage is represented in a rightward direction of paper face. When the input signal 100 becomes a maximum value or minimum value, the differentiated signal 104 becomes a zero level shown by dotted line 125. Whenever the differentiated signal passes the zero level, the zero level comparator 106 produces a pulse 126. The pulse signal 107 is supplied to a flip-flop circuit 108.

Whenever the pulse 126 of the pulse signal 107 is supplied to the flip-flop circuit 108, its Q terminal alternately repeats a high level and a low level. Therefore, if the Q terminal output and the pulse signal 107 are input to an AND circuit 109, a pulse signal 110 with every other pulse as shown in FIG. 6D is outputted. If the output 102 from the amplifier 101 is sampled at the timing of the pulse signal 110 by a sample-and-hold circuit 111, the sample-and-hold circuit 111 produces a level signal 112 holding the lower level of the amplitude of the input signal 100 indicated by circle points 113 in FIG. 6A.

On the other hand, whenever the pulse 126 of the pulse signal 107 is supplied to the flip-flop circuit 108, its Q-bar terminal alternately repeats a high level and a low level in a manner opposite to the Q terminal. Therefore, if the Q terminal output and the pulse signal 107 are input to an AND circuit 114, a pulse signal 110 with every other pulse which is opposite to the pulse signal 110 as shown in FIG. 6E is outputted. If the output 102 from the amplifier 101 is sampled at the timing of the pulse signal 115 by a sample-and-hold circuit 111, the sample-and-hold circuit 111 produces a level signal 117 holding the upper level of the amplitude of the input signal 100 indicated by triangle points 113 in FIG. 6A. Thus, if the level signals 117 and 112 are supplied to a differential operation circuit 118, an amplitude signal 119 corresponding to the amplitude of the input signal 100 can be obtained.

However, as the case may be, owing to different timings of the pulse signals 110 and 115, the level signal 112 may hold the upper level of the input signal 100 whereas the level signal 117 holds the lower level thereof, thereby providing a negative amplitude signal. In order to obviate such inconvenience, a switch circuit 121 which selects its A terminal if a control signal is positive and selects its B terminal if the control signal is negative is used. If the amplitude signal 119 is inputted to the A terminal, to the B terminal through an inverter 120 and to the control terminal of the switch 121, an output signal 122 which can always represent the amplitude signal by a positive value is obtained from the switch circuit 121. The output signal 122 represents the amount of reflected light modulated by marks such as pre-wobbled pits, and hence corresponds to the modulation degree signal 36b or 36c.

Now referring to FIGS. 7A to 7C and 8A to 8C, an explanation will be given of the automatic focusing control according to this embodiment.

Figure 7A:
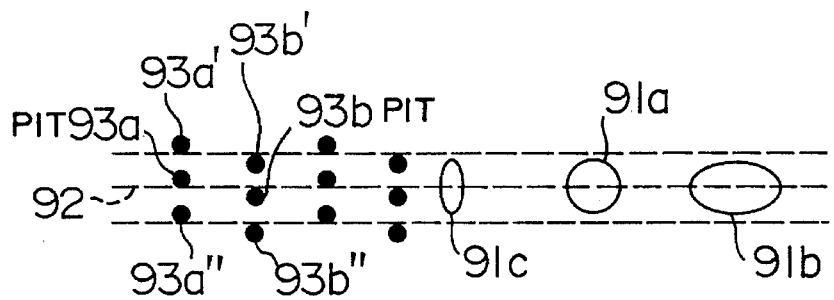
FIGS. 7A to 7C are views for explaining the operation of an embodiment in which a straight groove diffraction grating is used.
Figure 7B:
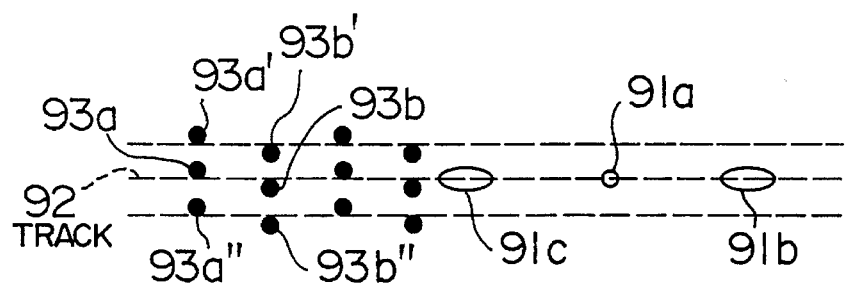
Figure 7C:
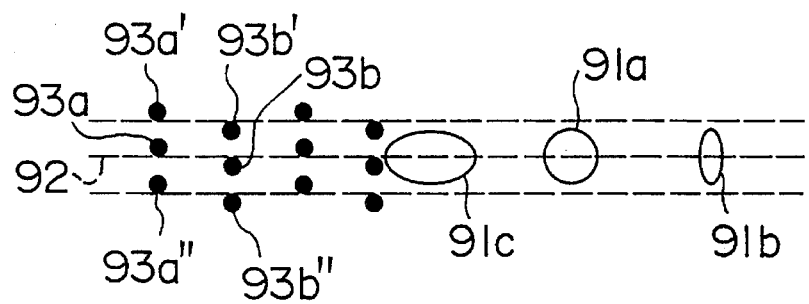

FIGS. 7A to 7C show the recording surface of the optical disk 30. As described above, one round of the recording area of the optical disk 30 is divided into 32 sectors each comprising 43 segments; at the start of each segment, rugged pre-wobbled pits 93a and 93b are arranged on a track 92 designated by dotted line. The pre-wobbled pits 93a (including 93a' and 93a") and 93b (including 93b' and 93b") are aligned over at least several tracks in the radial direction of the optical disk 30 (vertical direction on paper face), respectively. The pitch of the track 92 is 1.5 μm. The pit 93a is deviated upward by ¼ track from the track center on paper face whereas the pit 93b is deviated downward by ¼ track from the track center on the paper face. 91a is the light spot corresponding to the zero-order beam 25a, 91b is the light spot corresponding to the + first-order beam 25b and 91c is the light spot corresponding to the − first-order beam 25c. When the pits 93a and 93b pass the light spots 91a, 91b and 91c, the respective light amounts of the zero-order reflected beam 31a, the + first-order beam 31b and the − first-order beam 31c are modulated.

FIG. 7B shows the recording surface of the disk in the case where it is located at the focus 29a of the zero-order beam 25a. The area of the spot 91a is minimum so that the disk is located at the position (target position for focusing) suitable for recording/reproducing of information. Since the diffraction grating 24 operates in the direction of the track 92, the + first-order beam 25b and the − first-order beam 25c are most converged at this disk position in the direction perpendicular to the track but not converged in the track direction. Thus, the light spots 91b and 91c are spots having the same size and being long in the track direction; specifically, the size is the same as the spot 91a in the radial direction of the disk and longer than the spot 91a in the track direction. Accordingly, the + first-order reflected beam 31b and the − first-order reflection beam 31c will be modulated by the same modulation degree by the pits 93a and 93b.

FIG. 7C shows the recording surface of the disk 30 in the case where it is located at the focal line 29c of the − first-order beam 25c. The light spot 91c results in a focal line which is vertically long; specifically, its size is the same as the spot 91a in the radial direction and shorter than it in the track direction. Since the pits 93a, 93a' and 93a" and the pits 93b, 93b' and 93b" are aligned over several tracks in the radial direction of the disk (vertical direction on paper face, the − first-order reflection beam 31c will be most greatly modulated. Since the light spot 91b becomes horizontally larger than in the case of FIG. 7B, the modulation degree of the + first-order reflection beam 31b will be smaller than in the case of FIG. 7B.

On the other hand, FIG. 7C shows the recording surface of the disk 30 in the case where it is located at the focal line 29b of the + first-order beam 25b. The light spot 91b results in a focal line which is vertically long; specifically, its size is the same as the spot 91a in the radial direction and shorter than it in the track direction. For the same reason as described above, the + first-order reflection beam 31b will be most greatly modulated. Since the light spot 91c becomes horizontally larger than in the case of FIG. 7B, the modulation degree of the − first-order beam 31c will be smaller than in the case of FIG. 7B.

Figure 8A:
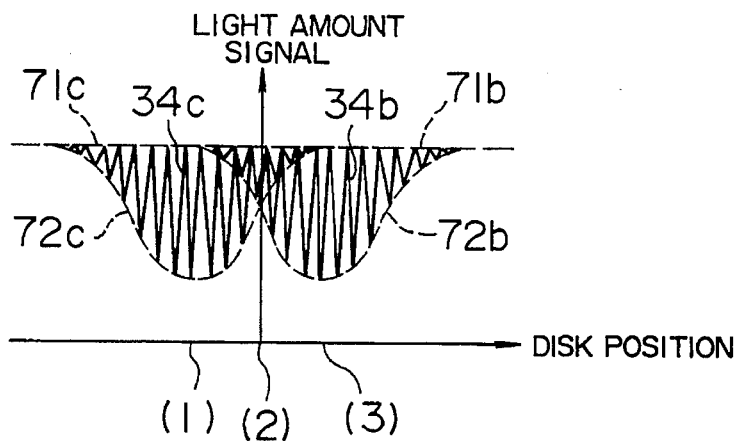
FIGS. 8A to 8C are views for explaining the operation of an embodiment in which a straight groove diffraction grating is used.

FIG. 8A shows changes in the modulation degrees of the light amount signals 34b and 34c due to the pits 93a and 93b with the abscissa of a change of the position of the optical disk in a focusing direction. In FIG. 8A, (1) in the abscissa denotes the position of the focal line 29c of the − first-order beam 25c; (2) denotes the position of the focus 25a of the zero-order beam 25a which is a target position for focusing; and (3) denotes the position of the focal line 29b of the + first-order beam 25b. Assuming that the focal distance when the diffraction grating 24 serves was a cylinder lens for ± first-order beams is f and the focal distance of the focusing lens 28 is fo, if f is much larger than fo (f≫fo), a difference δ between the focal line 29b or 29c and the focus 29a can be expressed by $$\delta = fo^2/f$$

In this embodiment, f=3000 mm, fo=3 mm so that δ=3 μm. Thus, the distance between the target position (2) in the abscissa and the position (1) of the focal line 29c or that of the focal line 29a is ±3 μm. In the case where the laser beams with the wavelength of 780 nm or so are converged using the focusing lens 28 having a numerical number (NA) of 0.55 or so, if the focus error of 2 to 3 μm occurs, the modulation ratio due to the pits will be decreased to about half. At the position of (1) of the disk, the − first-order reflection beam 25c are most greatly modulated so that the amplitude of the light amount signal 34c is maximum. At the position of (3) of the disk, the + first-order reflection beams 25b are most greatly modulated so that the amplitude of the light amount signal 34b is maximum. At the position of (2), the deviation from the focal lines of the + first-order beam 25b and the − first-order beam 25c are 3 μm, the amplitudes of the light amount signals 34b and 34c are equal to each other and are decreased to about half of the maximum amplitude.

The light amount signals 34b and 34c are supplied to the envelope detecting circuits 35b and 35c described in connection with FIG. 5. The envelope detecting circuit 35b detects the upper level 71b and the lower level 72b of the amplitude of the light amount signal 34b in FIG. 8A to produce a difference therebetween, i.e. the amplitude degree signal 36b of the light amount signal 34b. The envelope detecting circuit 35c detects the upper level 71c and the lower level 72c of the amplitude of the light amount signal 34c in FIG. 8A to produce a difference therebetween, i.e. the amplitude ratio signal 36c of the light amount signal 34c.

Figure 8B:
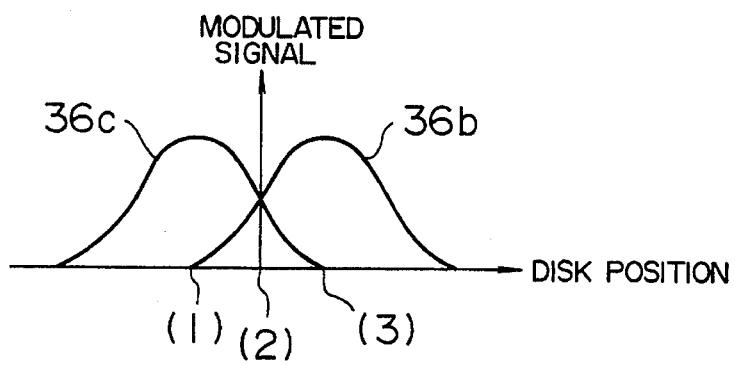

FIG. 8B shows the modulation degree signals 36b and 36c produced from the envelope detecting circuits 35b and 35c, respectively. As seen from FIG. 8B, the modulation ratio signal 36b has a maximum value at the disk position of (1) whereas the modulation ratio signal 36c has a maximum value at the disk position of (3). They have half of the maximum value at the disk position of (2) which is a target position for focusing.

Figure 8C:
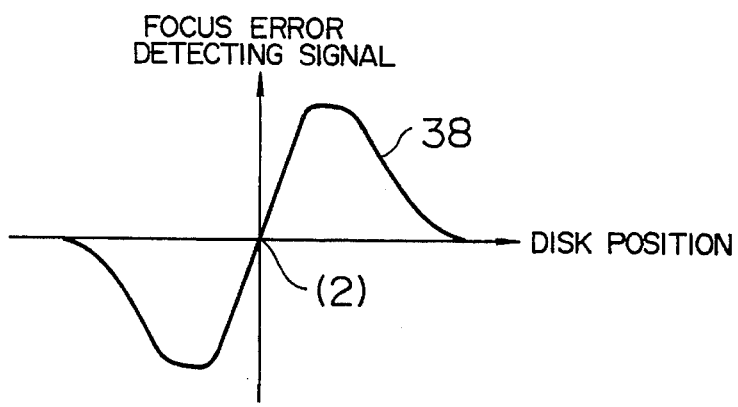

Therefore, if the modulation degree signals 36b and 36c are inputted to the differential operation circuit 37 (FIG. 2), the focus error detecting signal as designated by solid line in FIG. 8C. If the optical disk 30 is located at the target position (2) for focusing, the focus error detecting signal 38 will automatically become zero. Thus, using this focus error detecting signal 38, the AF driving mechanism 42 of the two-dimensional actuator 41 is driven to move the focusing lens 28 in its optical axis direction so that the automatic focusing control can be carried out.

In an ordinary optical disk device, the response frequency required in an automatic focusing control system is 2 kHz or so. On the other hand, in this embodiment, the number of segments on each of which the pre-wobbled pits 93a and 93b are arranged is 32×43= 1376 for one round of track. Since the rotating speed of the optical disk 30 is 2400 rpm (40 Hz), the sampling frequency for the focus error detecting signal is about 55 kHz. Therefore, in accordance with this embodiment, the automatic focusing control can be in a sufficiently stabilized manner.

As understood from the above description, in this embodiment, the photo-detecting elements 33b and 33c have only to receive the entire light amounts of the + first-order reflection beam 31b and the − first-order reflection beam 31c; the target for focusing can be automatically adjusted without adjusting the positions of the photo-detecting elements. Changes in the positions where the photo-detecting elements are attached will generate no detecting error in the focus error detecting signal. Further, the focus error detecting method according to this embodiment can also be applied to the waveguide type optical head.

Now referring to FIGS. 9 and 10, an explanation will be given of tracking control in this embodiment.

Figure 9:
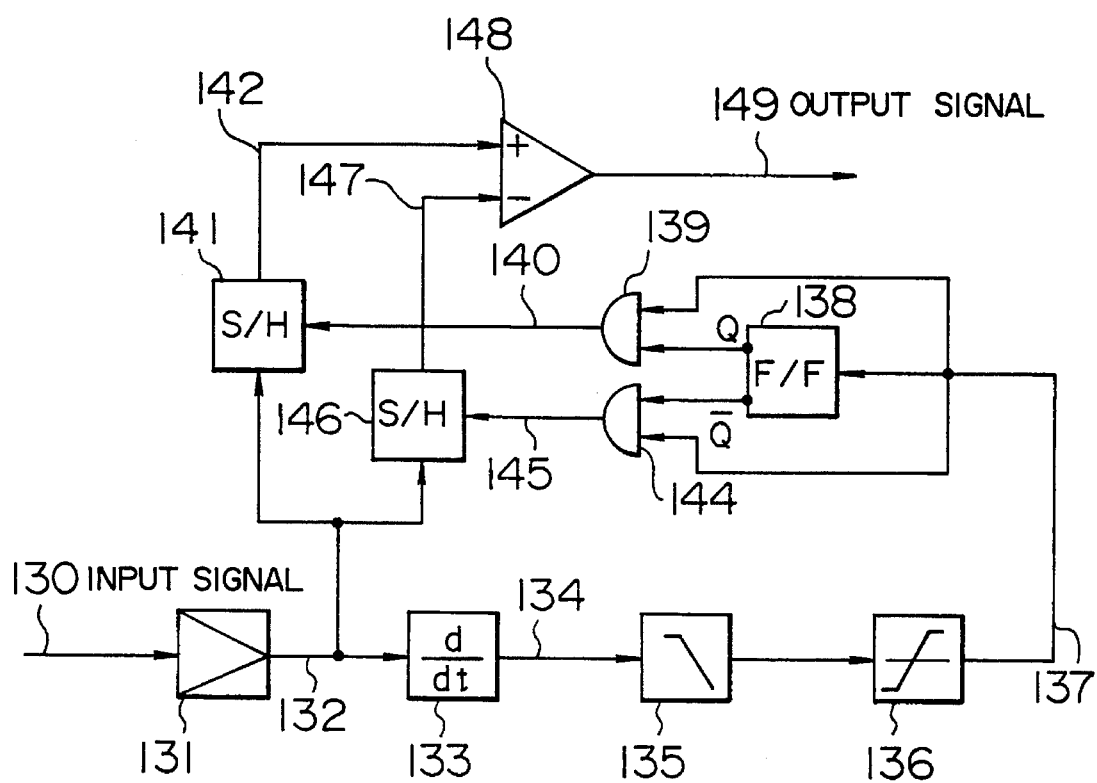
FIG. 9 is a block diagram of the sample servo circuit in FIG. 2.

FIG. 9 is a block diagram of the sample serve circuit 39. In operation, an input signal 130 is amplified by an amplifier 131 and differentiated by an differentiation circuit 133. The high frequency noise of a differentiated signal from the circuit 133 is removed by a filter 135 and directed to a rising zero level comparator 136 to provide a pulse signal 137.

Figure 10A:
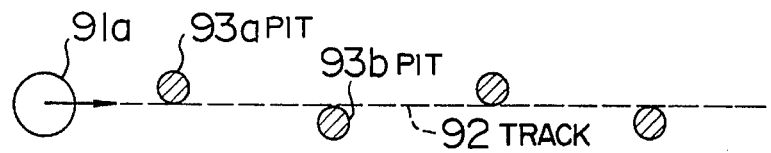
FIGS. 10A to 10J are views for explaining the operation of the sample servo circuit of FIG. 9.

FIG. 10A shows the recording surface of the optical disk 30 as shown in FIG. 7B, particularly the part relative to tracking control. In FIG. 10A, 91a is the light spot of the zero-order beam 25a; 92 is a track center; 93a are pits located at the position deviated upward ¼ track from the track center by ¼ on paper face; and 93b are pits located at the position deviated downward ¼ track from the track center on the paper face. It should be noted that the light spot travels along the line just on the track center 92 (target for tracking control) rightward on the paper face.

Figure 10B:
Figure 10C:
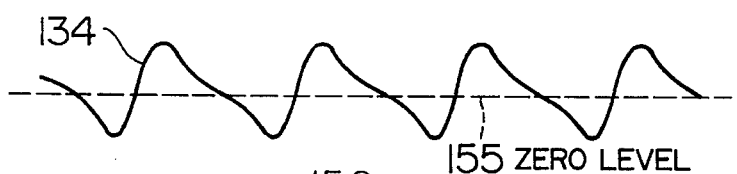
Figure 10D:

FIG. 10B shows an example of the input signal 130; FIG. 10C shows its differentiated signal 134; FIG. 10D shows the pulse signal 137. In FIGS. 10A to 10J, the same time passage is represented in a rightward direction of paper face. When the input signal 130 becomes a maximum value or minimum value, the differentiated signal 134 becomes a zero level shown by dotted line 155. Whenever the differentiated signal passes the zero level 155 from a negative level to a positive level, the rising zero level comparator 106 produces a pulse 156. The pulse signal 137 is supplied to a flip-flop circuit 138.

Figure 10E:

Whenever the pulse 156 of the pulse signal 137 is supplied to the flip-flop circuit 138, its Q terminal alternately repeats a high level and a low level. Therefore, if the Q terminal output and the pulse signal 137 are inputted to an AND circuit 139, a pulse signal 140 with every other pulse as shown in FIG. 10E is outputted. If the output 132 from the amplifier 131 is sampled at the timing of the pulse signal 140 by a sample-and-hold circuit 141, the sample-and-hold circuit 141 produces a level signal 142 holding the level modulated by the pit 93a indicated by circle points 143 in FIG. 10B.

Figure 10F:

On the other hand, whenever the pulse 156 of the pulse signal 137 is supplied to the flip-flop circuit 138, its Q-bar terminal alternately repeats a high level and a low level in a manner opposite to the Q terminal. Therefore, if the Q terminal output and the pulse signal 137 are inputted to an AND circuit 144, a pulse signal 140 with every other pulse which is opposite to the pulse signal 140 as shown in FIG. 10F is outputted. If the output 132 from the amplifier 131 is sampled at the timing of the pulse signal 145 by a sample-and-hold circuit 111, the sample-and-hold circuit 141 produces a level signal 117 holding the level modulated by the pits 93b indicated by triangle points 113 in FIG. 10B. Thus, if the level signals 147 and 142 are supplied to a differential operation circuit 148, an output signal 149 therefrom can be used as the tracking error detecting signal 40 (FIG. 2).

Figure 10G:
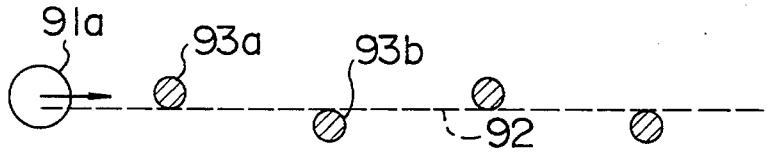
Figure 10H:
Figure 10I:
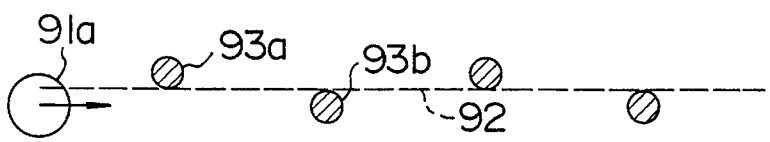
Figure 10J:
Figure 11:
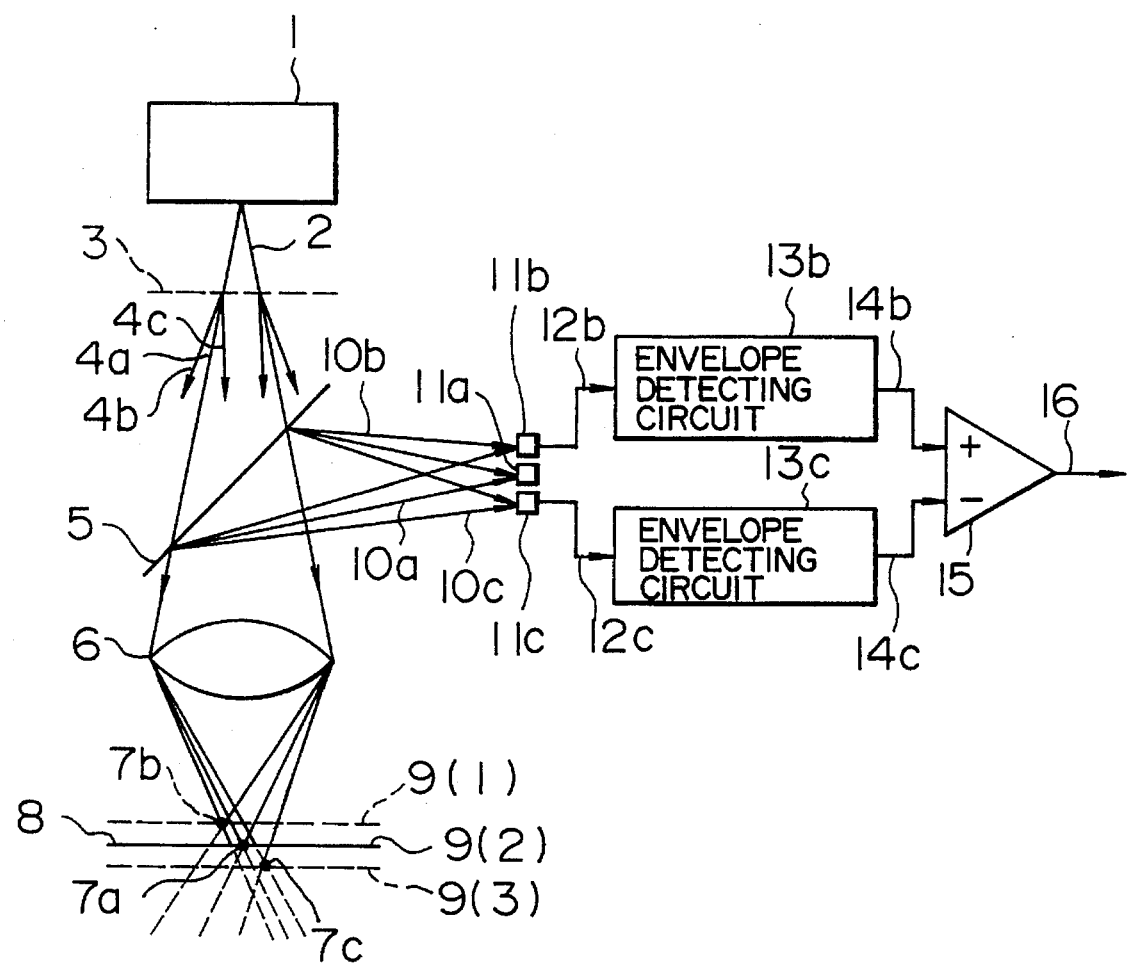
FIG. 11 is a view for explaining the principle of the method for detecting a focus error using a diffraction grating.
Figure 12A:
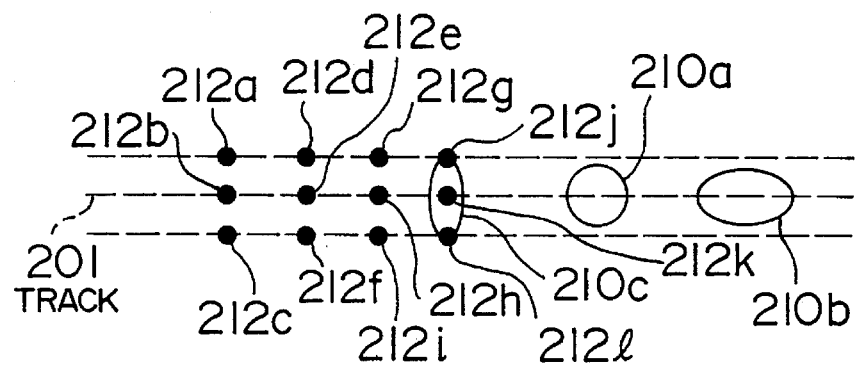
FIGS. 12A to 12C are views for explaining the effect of the method for detecting a focus error using a diffraction grating.
Figure 12B:
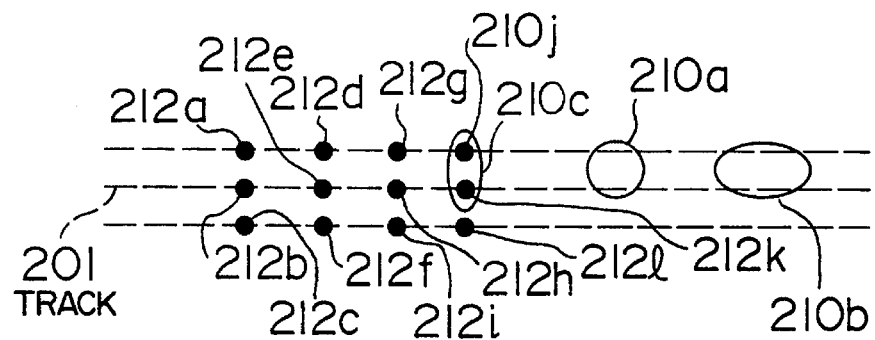
Figure 12C:
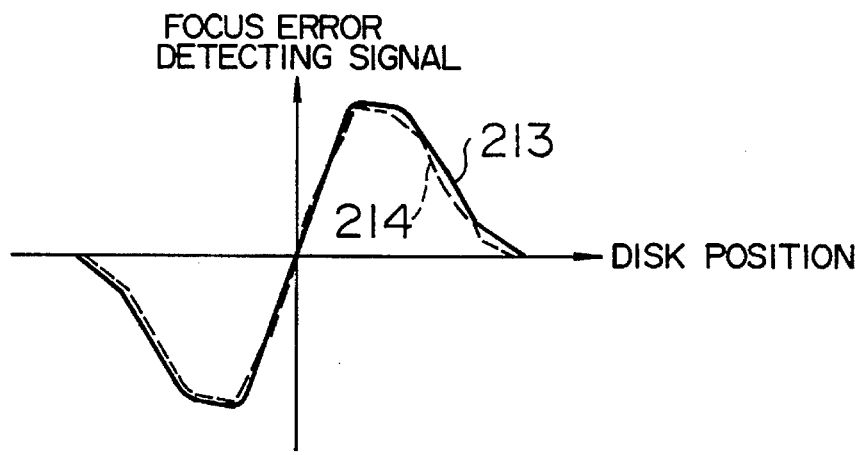

Now it should be noted that the pits 93a and 93b are deviated from the track center 92 by the same amount. Therefore, if the spot 91a travels along the line just on the track center 92 (target for tracking control), the respective signal levels 143 and 148 modulated by the pits 93a and 93b are equal to each other so that the tracking error detecting signal 40 (149) automatically becomes a servo level. If as shown in FIG. 10G, the spot 91a travels along the line deviated upward from the track center on the paper face, as shown in FIG. 10H, it will be more greatly modulated by the pits 93a so that the corresponding modulation level 143 becomes a lower level, but it will not so greatly modulated by the pits 93b so that the corresponding modulation level 148 becomes a higher level. Thus, the tracking error detecting signal 40 (149) will have a negative level. On the other hand, if as shown in FIG. 10I, the spot 91a travels along the line deviated downward from the track center on the paper face, as shown in FIG. 10J, it will not be so greatly modulated by the pits 93a so that the corresponding modulation level 143 becomes a higher level, but it will be more greatly modulated by the pits 93b so that the corresponding modulation level 148 becomes a lower level. Thus, the tracking error detecting signal 40 (149) will have a positive level. Using this tracking error detecting signal 40, the TR driving mechanism 43 of the two-dimensional actuator 41 is driven to move the focusing lens 28 in the radial direction of the disk so that the automatic tracking control can be carried out.

In an ordinary optical disk device, the response frequency required in an automatic tracking control system is 8 kHz or so. On the other hand, in this embodiment, the sampling frequency for the tracking error detecting signal is about 55 kHz which is equal to that for the focus error detecting signal. Therefore, in accordance with this embodiment, the automatic tracking control can be in a sufficiently stabilized manner.

As understood from the above description, in this embodiment, the photo-detecting elements 33a has only to receive the entire light amount of the zero-order reflected beam 31a; the target for tracking can be automatically adjusted without adjusting the position of the photo-detecting element 33a. A change in the position where the photo-detecting elements are attached will generate no detecting error in the tracking error detecting signal.

Also in the optical disk device to which this embodiment is applied, information can be recorded and reproduced in the same manner as in the ordinary optical disk device. Specifically, this embodiment can be applied to a write-once type optical disk, an optomagnetic disk, a phase-change optical disk, etc. regardless of the kind of the recording film on an optical disk.

Now referring to FIG. 2, the case of using the write-once optical recording medium will be explained. In recording information, a pulse-like driving current corresponding to information to be recorded is passed through the semiconductor laser 21 to modulate the intensity of the emitted laser beam in a pulse shape; using the light spot 91a of the zero-order beam 25a, the recording film on the optical disk 30 is thermally bored to record the information as holes. In reproducing the information, a predetermined power is applied to the semiconductor laser 25 to cause the semiconductor laser 21 to emit the laser beam; likewise, the light spot 91a of the zero-order beam 25aemitted is used to reproduce the information. The information can be reproduced on the basis of a change in the light amount signal 34a corresponding to the light amount of the reflection beam 31a which is modulated by the information recorded as holes.

In the case of using the phase-change optical recording medium, which is only different from the above case in that information is recorded as changes in the refractive index but not as holes, the optical head used in this embodiment can be used as it is.

In the case of using the optomagnetic recording medium, information will be recorded and reproduced as follows. In order to record the information, a magnetic field is applied to the opto-magnetic recording medium by a magnetic field applying means on the side opposite to the focusing lens 28 with respect to the optical disk 30 thereby to invert the magnetization direction of a perpendicularly magnetized film. On the other hand, in order to reproduce the information, the direction of magnetization inverted as the information is detected on the basis of the Kerr effect. More specifically, the reflected beams 31a corresponding to the light spot 91a are separated into two orthogonal polarized light components which will individually received by two photo-detectors. The information can be reproduced using a difference signal between the outputs from the photo-detectors.

As understood from the above description, in accordance with this embodiment, targets for focusing in the focusing control and for tracking in the tracking control can be automatically adjusted so that adjusting the positions of optical components such as photo-detectors and lenses, which was required in the conventional process for assembling an optical head, is not required. Changes in the positions where the optical components are attached will produce no detecting error in the focus error detecting signal and the tracking error detecting signal. Further, this embodiment can also be applied to the waveguide type optical head.

Figure 13A:
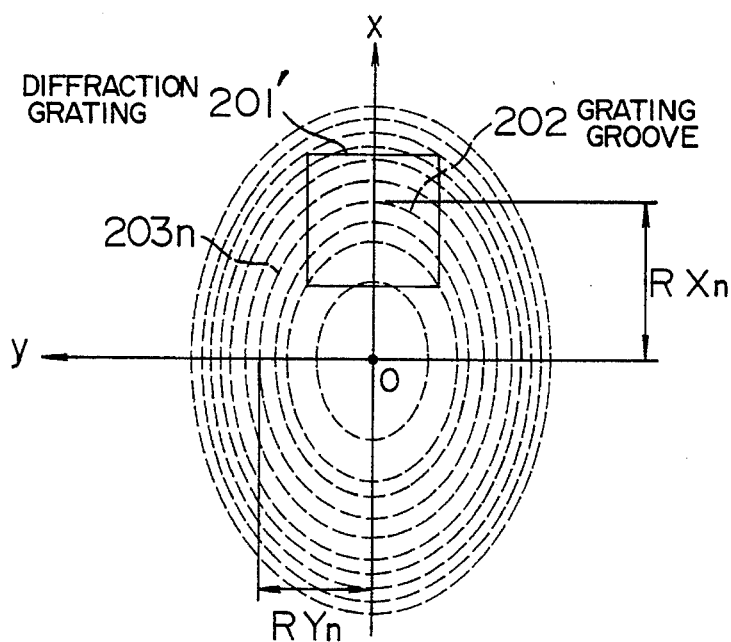
FIGS. 13A and 13B are views for explaining the structure and function of a concentric elliptical diffraction grating.
Figure 13B:
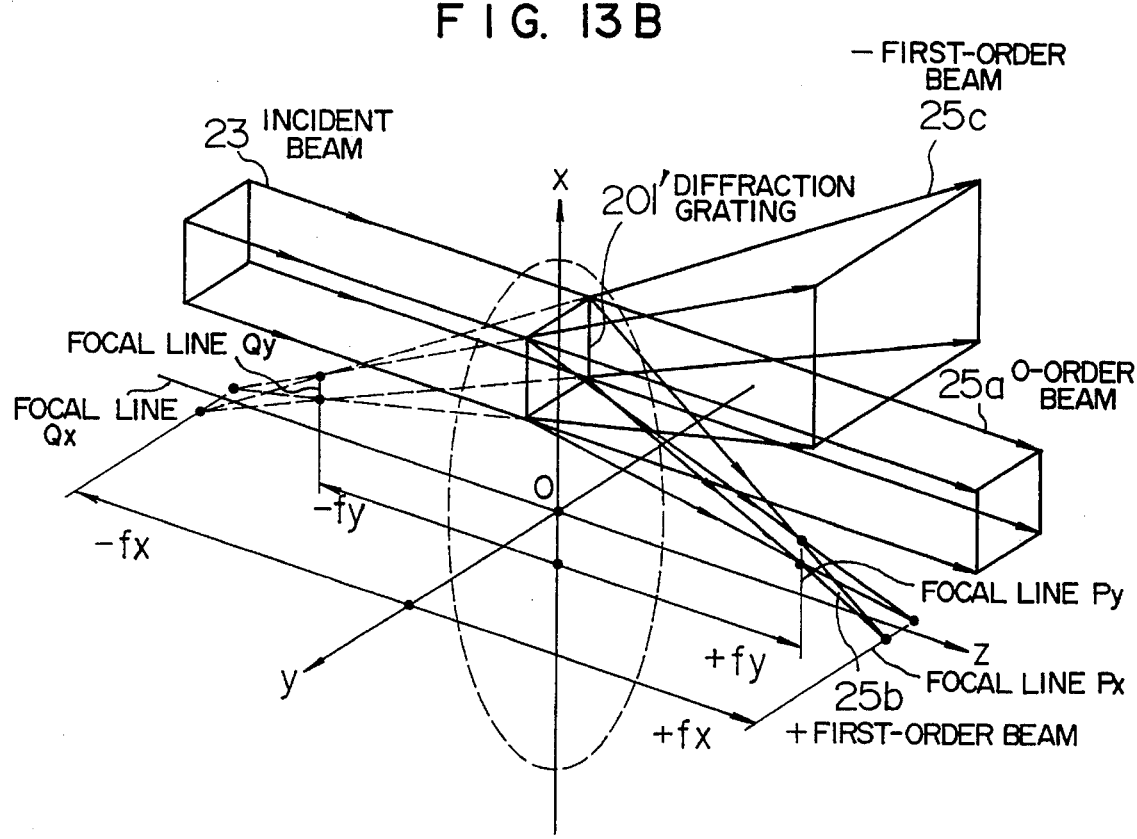

Now referring to FIGS. 13A and 13B and FIG. 14, the second embodiment using a diffraction grating will be explained. In this second embodiment, a non-equidistant elliptical diffraction grating 201' as shown in FIG. 13A is used instead of the non-equidistant straight diffraction grating 24 as shown in FIG. 3A. The structure and function of the other components will not be explained here since they are entirely the same as in the first embodiment explained hitherto.

The grating groove 202 of the concentric elliptical diffraction grating 201' is a part (elliptical arc) of concentric ellipse 203n (n=1, 2, 3, ... ) with an origin O as designated in a dotted line in FIG. 13A. An x-axis and y-axis are taken in the major axis and the minor axis of the ellipse 203n within a plane including the diffraction grating 201', respectively; a z-axis is taken in the beam traveling direction; and the coordinate origin is taken at O. In this case, the radius RXn (n=1, 2, 3, ... ) of the ellipse 203n in its major axis direction can be expressed by $$RXn = \sqrt{\{(fx + n\lambda)^2 - fx^2\}}$$

and the radius of RYn (n=1, 2, 3, ... ) of the ellipse 203n in its minor axis can be expressed by $$RYn = \sqrt{\{(fy + n\lambda)^2 - fy^2\}}$$

wherein fy<fx

Then, as described in connection with FIG. 4, on the x–y plane, the + first-order beams 25b are converged at the points apart from the origin O by fx on the z-axis, and the − first-order beam 25c is diverged so as to be emitted from at the points apart from the origin O by − fx on the z-axis. On the other hand, on the y–z plane, the + first-order beam 25b are converged at the points apart from the origin O by fy on the z-axis, and the − first-order beam 25c is diverged so as to be emitted from at the points apart from the origin O by − fy on the z-axis. Thus, as shown in FIG. 13B, the + first-order beam 25b are converged on a focal line Px in the x-direction and a focal line Py in the y-direction whereas the − first-order beam 25c is diverged so as to be emitted from a focal Qx in the x-direction and from a focal line Qy in the y-direction. In this way, the concentric elliptical diffraction grating 201' serves as a positive tholoidal lens having focal distances fx and fy for the + first-order beam 25b whereas it serves as a negative tholoidal lens having focal distances −fx and −fy. Accordingly, the concentric elliptical diffraction grating 201' provides the + first-order beam 25b and the − first-order beam 25c with astigmatism (strong in the minor axis of the ellipse and weak in the major axis thereof) having the same absolute value but in two (positive and negative) directions, and emits these beams in the direction different from that of the zero-order beam 25a by positive and negative minute angles.

It is assumed in this embodiment that the concentric elliptical diffraction grating 201' explained in connection with FIG. 13A is arranged so that the y-direction (minor axis of the ellipse 203) in FIG. 13A is perpendicular to paper face in FIG. 2 and the x-direction (major axis of the ellipse 203) is within the paper face in FIG. 2.

FIGS. 14A to 14E show the recording surface of the optical disk 30 in the case where concentric elliptical diffraction grating 201' is used; located on the recording surface are the light spot 91a of the zero-order beam 25a, the light spot 91b of the + first-order beam 25b and the light spot 91c of the − first-order beam 25c. The direction parallel to the paper face in FIGS. 14A to 14E corresponds to the x-direction (major axis of the ellipse 203) in FIG. 13A whereas the direction perpendicular to the paper face corresponds to the y-direction (minor axis of the ellipse 203) in FIG. 13A. It should be noted that the pits 93s and 93b have the same function as described in FIG. 7.

FIG. 14C shows the case where the optical disk 30 is located at the focus 29a of the zero-order beam 25a. The light spot 91a has the smallest area so that the disk 30 is located at the position (target position for focusing) suitable to record/reproduce information. Because of the astigmatism supplied by the diffraction grating 201 which is strong in the direction perpendicular to the paper face (y-direction) and weak in the direction parallel thereto (x-direction), the + first-order beam 25b and the − first-order beam 25c are converged at the position greatly shifted in the y-direction and slightly shifted in the x-direction. Thus, they result in the elliptical spots 91a and 91b having the same size and being long in a vertical direction. Accordingly, the + first-order reflection beam 31b and the − first-order reflection beam 31c will be modulated by the same ratio owing to the pits 93a and 93b.

FIG. 14B shows the case where as in FIG. 7A, the optical disk 30 is located on the focal line of the − first-order beam 25c in the x-direction. In this case, the + first-order beams 25c is most greatly condensed in the horizontal direction so that the corresponding spot 91c becomes a spot which is long in the vertical direction. Since the pits 93s and 93b are aligned over at least several tracks in the radial direction of the disk (direction perpendicular to the paper face), respectively, the − first-order beam 25c will be modulated by the largest degree. On the other hand, the spot 91b of the + first-order beam 25b becomes larger than in FIG. 14C so that the + first-order reflection beam 31b will be modulated by the ratio which is smaller than in FIG. 14C.

FIG. 14A shows the case where as in FIG. 7A, the optical disk 30 is located on the focal line of the − first-order beam 25c in the x-direction to be further apart from the focusing lens 28. In this case, the − first-order beam 25c are most greatly condensed in the vertical direction so that the corresponding spot 91c becomes a spot which is long in the horizontal direction. Thus, the − first-order reflection beam 25c will be modulated by the ratio which is smaller than in FIG. 14B. On the other hand, the spot 91b of the + first-order beam 25b becomes further larger than in FIG. 14B so that the + first-order reflected beam 31b will be modulated by the ratio which is smaller than in FIG. 14B.

FIG. 14D shows the case where as in FIG. 7C the optical disk 30 is located on the focal line of the + first-order beam 25b in the x-direction. In this case, the + first-order beam 25b are most greatly condensed in the horizontal direction so that the corresponding spot 91c becomes a spot which is long in the vertical direction. Since the pits 93a and 93b are aligned over at least several tracks in the radial direction of the disk (direction perpendicular to the paper face), respectively, the + first-order beams 25b will be modulated by the largest ratio. On the other hand, the spot 91c of the − first-order beam 25c becomes larger than in FIG. 14C so that the − first-order reflected beam 31c will be modulated by the ratio which is smaller than in FIG. 14C.

FIG. 14E shows the case where as in FIG. 7A, the optical disk 30 is located on the focal line of the + first-order beam 25b in the y-direction to be further near to the focusing lens 28. In this case, the + first-order beam 25b are most greatly condensed in the vertical direction so that the corresponding spot 91b becomes a spot which is long in the horizontal direction. Thus, the + first-order reflected beam 25b will be modulated by the degree which is smaller than in FIG. 14D. On the other hand, the spot 91c of the − first-order beam 25c becomes further larger than in FIG. 14D so that the − first-order reflected beam 31c will be modulated by the ratio which is smaller than in FIG. 14D.

Accordingly, with a change in the disk position in the focusing direction represented in the abscissa, the modulation degrees of the light amount signals 34b and 34c vary owing to the pits 93a and 93b as shown in the graph of FIG. 8 previously explained. Specifically, the amplitude of the output signal 34b from the photo-detecting element 33b is maximum at the disk position of (3), that of the output signal 34c from the photo-detecting element 33c is maximum at the disk position of (1), and they are equal to each other at the disk position of (2). Further, the modulation degree signals 36b and 36c produced from the envelope detecting circuits 35b and 35c are such as shown in FIG. 8B. Accordingly, the focus error detecting signal designated by the solid line 38 in FIG. 8C can be produced by the differential operation circuit 37; if the optical disk 30 is located at the target position (2) for focusing, the focus error detecting signal will become automatically a zero level.

It is assumed in this embodiment that like the diffraction grating used in the first embodiment, the concentric elliptical diffraction grating 201' has an effective area of 5 mm square and provides a diffraction angle of ±0.745° for the ± first-order beams. Further, it is assumed in this embodiment that the focal distance fx of the grating serving as a tholoidal lens for the ± first-order beams in the x-direction (direction of the track center 92 in FIGS. 14A to 14E) is 3000 mm, and the focal distance fy of the grating serving as a tholoidal lens for the ± first-order beams in the y-direction (direction perpendicular to the track center 92 in FIGS. 14A to 14E) is 1500 mm. Then, since a difference δx between the position of the focal line of ± first-order beams converging in the x-direction and the focus of the zero-order beams in the optical axis direction can be expressed by $$\delta x = fo^2/fx$$

where fo which is the focal distance of the focusing lens 28, is 3 mm as in the first embodiment, δx=3 μm. Thus, as in FIG. 8A, the modulation degree of the ± first-order beams at the target position (2) for focusing is half the maximum modulation ratio of the ± first-order beams at the focal line converging in the x-direction; as a result, the focus error detecting signal has a curve as designated by the solid line in FIG. 8C. On the other hand, since a difference δx between the position of the focal line of ± first-order beams converging in the y-direction and the focus of the zero-order beams in the optical axis direction can be expressed by δ=fo²/fy, δ=6 μm. The radius RXn (n=1, 2, 3, . . . ) and RYn (n=1, 2, 3, . . . ) of the ellipse 203n of the grating groove 202 in its major and minor axis directions can be calculated by the equations described previously:

$$RXn = \sqrt{\{(fx + n\lambda)^2 - fx^2\}} \text{, and}$$

$$RYn = \sqrt{\{(fy + n\lambda)^2 - fy^2\}}$$

Table 2 shows the values of RXn and RYn calculated in the ranges of 39.5 mm≦RXn≦41.5 mm and 18.2≦RYn≦ 20.7 mm assuming that the wavelength λ=0.00078 mm (780 nm), the diffraction angle θ of the ± first-order beams θ=±0.745° and the size of the grating is 5 mm square. ΔXn denotes a grating groove pitch. The value thereof is 60.0 μm at the center of the diffraction grating, and decreased from 64.1 μm to 56.4 μm at a further position from the origin O.

TABLE 2

| n | RXn (mm) | ΔXn (mm) | RYn (mm) |
|---|---|---|---|
| 368 | 41.50087 |  | 20.75043 |
| 367 | 41.44444 | 0.05643 | 20.72222 |
| 366 | 41.38794 | 0.05650 | 20.69397 |
| 365 | 41.33136 | 0.05658 | 20.66568 |
| ... | ... | ... |  |
| 327 | 39.12065 |  | 19.56033 |
| 326 | 39.06078 | 0.05987 | 19.53039 |
| 325 | 39.00082 | 0.05996 | 19.50041 |
| 324 | 38.94077 | 0.06005 | 19.47039 |
| 323 | 38.88063 | 0.06014 | 19.44031 |
| ... | ... | ... |  |
| 287 | 36.64983 |  | 18.32492 |
| 286 | 36.58592 | 0.06391 | 18.29296 |
| 285 | 36.52190 | 0.06402 | 18.26095 |
| 284 | 36.45777 | 0.06413 | 18.22889 |

In accordance with this embodiment, even when any tracking error occurs, the pull-in operation of the automatic focusing control can be carried out in a stabilized manner. Further, by combining an optical disk formatted for a sample servo system with tracking control by sample servo, an optical head in which adjustment of the positions of optical components is not substantially required.

B, Embodiments using an acoustooptic element

Now referring to FIGS. 16 to 26, an explanation will be given of a focus error detecting method using an acoustooptic element.

Figure 16:
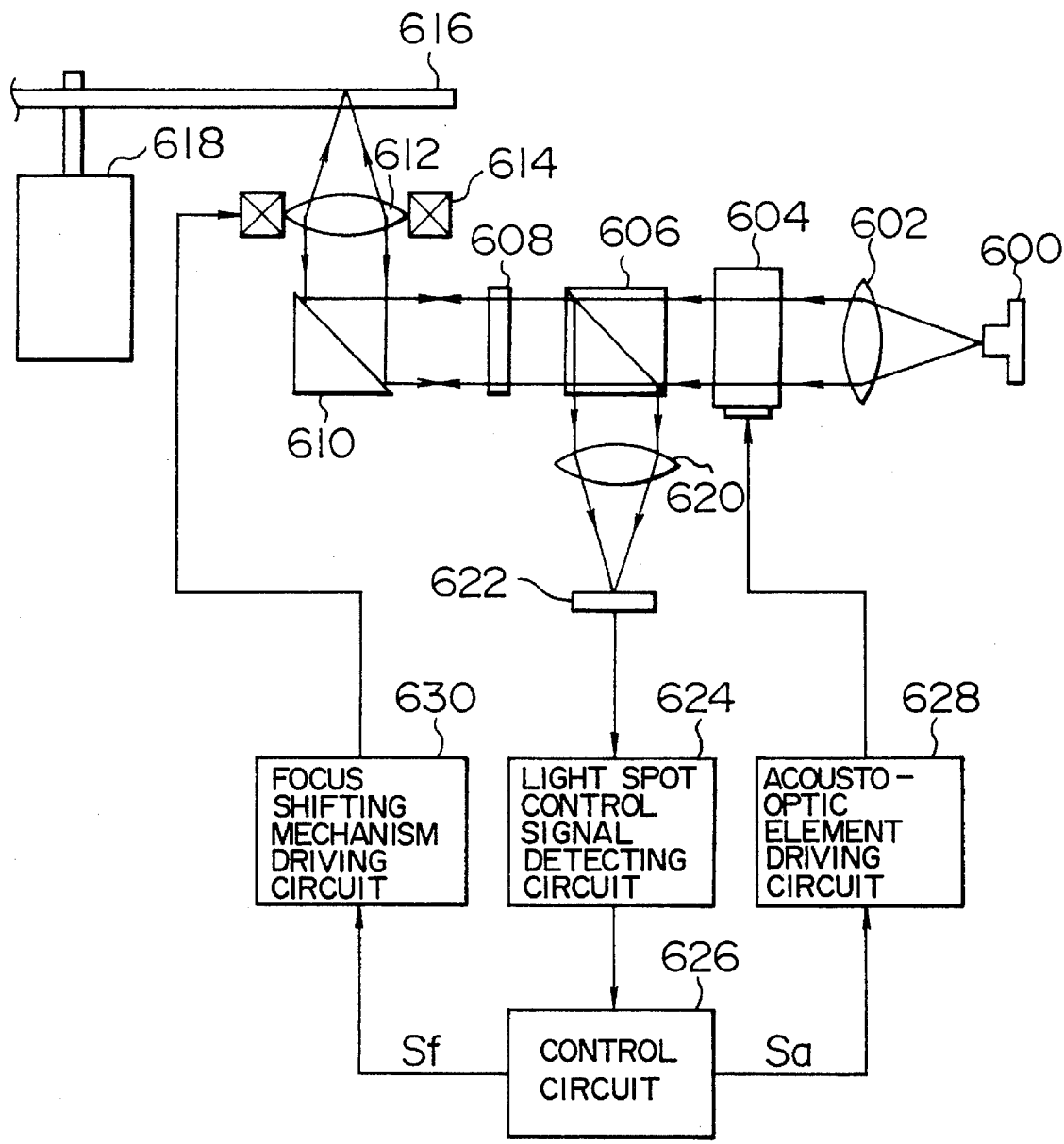
FIG. 16 is a block diagram showing the entire arrangement of an embodiment in which an acoustooptic element is used.

FIG. 16 shows the entire arrangement of an optical disk device provided with an acoustooptic element. The light emitted from a semiconductor laser 600 is converted into a collimated (parallel) light beam by a collimating lens 602, and directed to an acoustooptic element 604. The acoustooptic element 604 may be a bulk crystal or a thin-film crystal using a surface elastic wave propagrating its surface. The light beam having its emission angle slightly changed by the acoustooptic element 604 is directed to a polarized light beam splitter 606. In this case, by selecting the polarization of the light beam to be P polarized light with respect to the polarized beam splitter 606, a large part of the light beam passes straight through the polarized light beam splitter 606. The light beam emerging from the polarized light beam splitter 606 is converged into a circularly polarized light beam through a λ/4 plate 606 and it is projected onto an optical disk 616 through a reflecting mirror 610 and a converging lens 612, thereby focusing the light spot on the optical disk 616. The light spot can be moved minutely in a tracking direction by the acoustooptic element 604 described above. The light spot can be controlled to be focused on the optical disk 616 by the converging lens 612 which is driven by a focus shifting means 614.

The light beam reflected by the optical disk 616 is again passed through the converging lens 612, the reflecting mirror 610 and the λ/4 plate 608, and again the light beam is restored to linearly polarized light by the λ/4 plate 608. At this time, the polarized light takes the form of S polarized light to the polarized light beam splitter 606 so that it is not passed through but reflected from the polarized light beam splitter 606. The reflected light beam is condensed onto a detector 622 by a converging lens. In addition to the components described above, a tracking actuator which serves to shift the optical head in the radial direction of disk is provided. But it is not explained here since it is not directly related to the present invention.

On the basis of the light spot condensed on the detector 622, a focus error detecting signal, a tracking error detecting signal and a data signal can be detected by a light spot control signal detecting system. These signals are sent to a control circuit 626 to produce a focus shifting mechanism driving signal Sf and an acoustooptic detecting element driving signal Sa. These driving signals Sf and Sa are used to drive a focus shifting mechanism 614 and the acoustooptic element 604 through a focus shifting mechanism driving circuit 630 and an acoustooptic element 628, respectively.

The operating theory of the acoustooptic element 604 will be explained with reference to FIG. 17. When the ultrasonic wave produced by a piezoelectric transducer 632 is propagated through a transparent medium, the compressional wave of the ultrasonic wave causes periodic variations of the refractive index due to the acoustooptic effect of the medium. This variation of the refractive index serves the role of a phase grating with respect to the light incident on the medium, thereby diffracting the light beam. Assuming that f represents the frequency of the ultrasonic wave, v the propagation velocity of the ultrasonic wave and λ the wavelength of the laser light, the diffraction angle θ can be expressed by $$\theta = f \cdot \lambda / v \qquad (1)$$

Generally, the propagation velocity v of the ultrasonic wave and the wavelength λ of the incident light are constant and therefore the driving frequency and the diffraction angle are proportional to each other. As a result, by changing the driving frequency, the diffraction angle can be changed, that is, the deflection angle of the light beam can be changed.

Figure 18A:
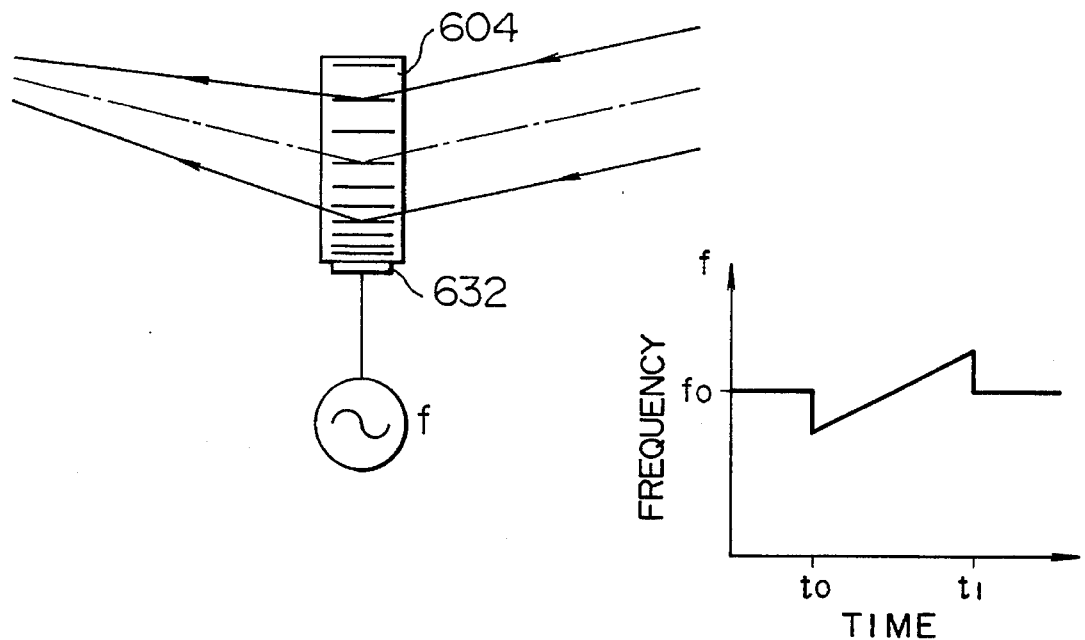
FIGS. 18A and 18B are views showing the states of emitted light when the driving frequency for the acoustooptic element is changed.
Figure 18B:
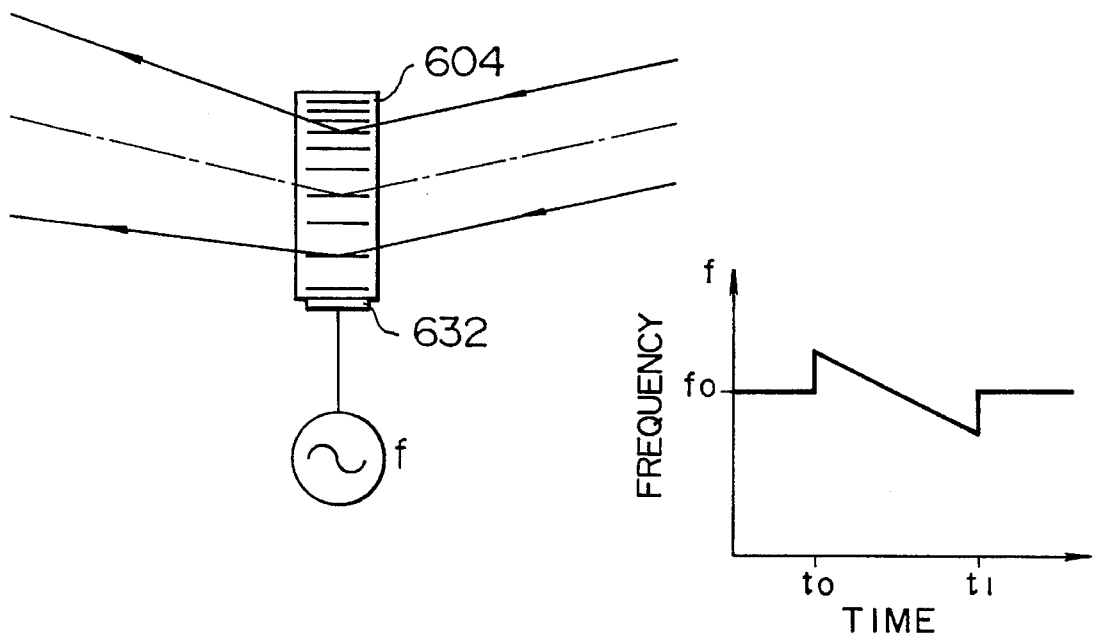

FIGS. 18A and 18B show the states of the incident light beam when the driving frequency of the acoustooptic element 604 is varied. It should be noted that increasing the driving frequency makes the interval in the compressional distribution of the ultrasonic wave thinner, thereby increasing the deflection angle.

Increasing the driving frequency within the time interval from t0 to t1 as shown in FIG. 18A results in a thinner interval in the compressional distribution and hence a larger deflection angle at a position nearer to the piezoelectric transducer 632 since it takes a certain time to propagate the ultrasonic wave through the crystal. Therefore, the incident collimated laser beam flux is emitted from the acoustooptic element 604 as converging light. Since the light emitted light remains the collimated light with the direction perpendicular to paper face, it is focused on a focus line.

Assuming that the frequency of the ultrasonic wave is f, the propagation speed thereof is v, and the wavelength of the laser light is λ, the distance from that of the acoustooptic element 604 to the position xf of the focal line can be expressed approximately by $$xf = \frac{v^2}{\lambda} / \frac{df}{dt} \qquad (2)$$

On the other hand, in contrast to the case of FIG. 18A, decreasing the driving frequency within the time interval from t0 to t1 as shown in FIG. 18B results in wider interval in the compressional distribution and hence a smaller deflection angle at a position nearer to the piezoelectric transducer 632. Therefore, the incident collimated laser beam flux is emitted from the acoustooptic element 604 as diverging light. It should be noted that the light emitted light remains the collimated light with the direction perpendicular to paper face.

Assuming that the frequency of the ultrasonic wave is f, the propagation speed thereof is v, and the wavelength of the laser light is λ, the position xf of the focal line for that of the acoustooptic element 604 can be expressed by Equation (2) as in the case of FIG. 18A. In this case, it should be noted that the focal line is located on the side of the incident light since df/dt<0.

Figure 19A:
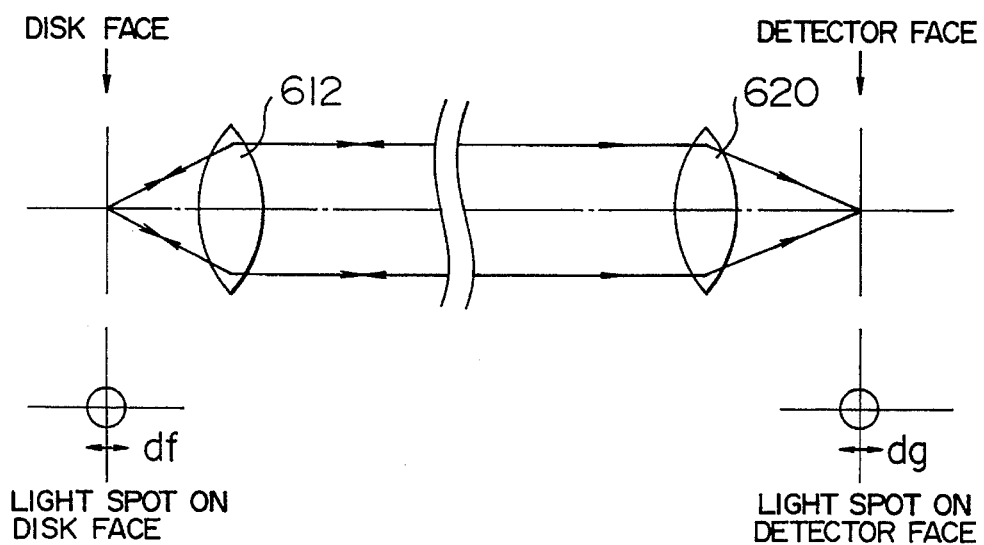
FIGS. 19A to 19C are views showing the states of light beams in an optical system.
Figure 19B:
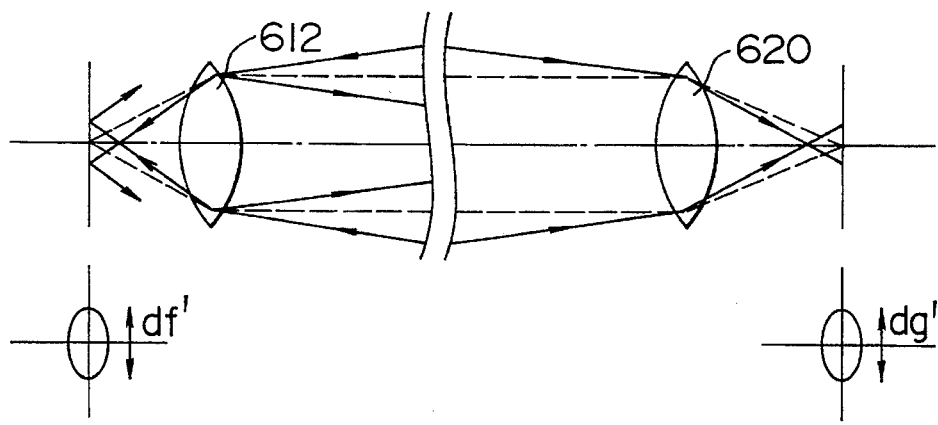
Figure 19C:
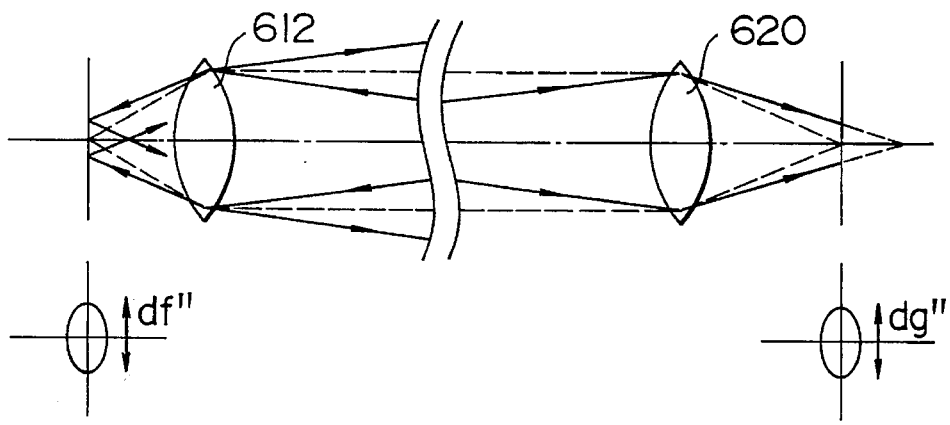

FIGS. 19A to 19C show the states of light beams and light spots in the relationships between the converging lens 612 and the disk face, the focusing lens 620 and the detector face, and the disk face and the detector face.

FIG. 19A shows the case where the driving frequency for the acoustooptic element is constant. In this case, the collimated light is incident on the converging lens 612 as it is. Then, if the light on the disk face is in an in-focus state, assuming that the effective numerical aperture of the converging lens 612 is NAf and the wavelength of the incident laser light is λ, the diameter df of the light spot on the disk face can be expressed approximately by $$df = \frac{\lambda}{NAf} \quad (3)$$

The light reflected from the disk is restored through the converging lens 612 to the collimated light which will be guided to a signal detecting system. Then, if the detector is located at the focus position of the focusing lens 620, assuming that the effective numerical aperture of the focusing lens 620 is NAg and the wavelength of the incident laser light is λ, the diameter dg of the light spot on the detector face can be expressed approximately by $$dg = \frac{\lambda}{NAg} \quad (4)$$

FIG. 19B shows the case where the driving frequency for the acoustooptic element is increased as shown in FIG. 18A. In this case, the converging light emitted from the acoustooptic element 604 is incident on the converging lens 612 so that the position of the its focal point (line) approaches the converging lens 612. On the other hand, the position of focal point (line) in the direction perpendicular to the paper face remains fixed, thus providing the light spot with astigmatism. Thus, the light spot on the disk results in an elliptical spot. In this case, although the diameter of the ellipse in its minor axis direction is equal to that in Equation (3), the diameter df' thereof in the major axis can be approximated as $$df' = \frac{ff \cdot daf}{xf} \quad (5)$$

where ff represents the focal distance of the converging lens 612, daf represents the effective aperture diameter of the converging lens 612 and xf represents the distance expressed by Equation (2) assuming that the distance between the acoustooptic element 604 and the converging lens 612 is shorter than xf.

The light reflected from the disk is restored through the converging lens 612 to the converging light which will be guided to the signal detecting system 18A. In this case, the converging light is incident on the focusing lens 620 so that the position of the its focal point (line) approaches the converging lens 612. On the other hand, the position of focal point (line) in the direction perpendicular to the paper face remains fixed, thus providing the light spot with astigmatism. Thus, the light spot on the detector results in an elliptical spot. In this case, although the diameter of the ellipse in its minor axis direction is equal to that in Equation (4), the diameter df' thereof in the major axis can be approximated as $$dg' = \frac{fg \cdot dag}{xf} \quad (6)$$

where fg represents the focal distance of the focusing lens, dag represents the effective aperture diameter of the focusing lens and xf represents the distance expressed by Equation (2) assuming that the distance between the converging lens 612 and the focusing lens 620 is shorter than xf.

FIG. 19C shows the case where the driving frequency for the acoustooptic element is decreased as shown in FIG. 18B. In this case, the diverging light emitted from the acoustooptic element 604 is incident on the converging lens 612 so that the position of the its focal point (line) leaves the converging lens 612. On the other hand, the position of focal point (line) in the direction perpendicular to the paper face remains fixed, thus providing the light spot with astigmatism. Thus, the light spot on the disk results in an elliptical spot. In this case, although the diameter of the ellipse in its minor axis direction is equal to that in Equation (3), the diameter df" thereof in the major axis can be approximated as $$df'' = \left| \frac{ff \cdot daf}{xf} \right| \quad (7)$$

where ff represents the focal distance of the converging lens 612, daf represents the effective aperture diameter of the converging lens 612 and xf represents the distance expressed by Equation (2) assuming that the distance between the acoustooptic element 604 and the converging lens 612 is shorter than xf.

The light reflected from the disk is restored through the converging lens 612 to the diverging light which will be guided to the signal detecting system. In this case, the diverging light is incident on the focusing lens 620 so that the position of the its focal point (line) leaves the converging lens 612. On the other hand, the position of focal point (line) in the direction perpendicular to the paper face remains fixed, thus providing the light spot with astigmatism. Thus, the light spot on the detector results in an elliptical spot. In this case, although the diameter of the ellipse in its minor axis direction is equal to that in Equation (4), the diameter dg' thereof in the major axis can be approximated as $$dg'' = \left| \frac{fg \cdot dag}{xf} \right| \quad (8)$$

where fg represents the focal distance of the focusing lens 620, dag represents the effective aperture diameter of the focusing lens 620 and xf represents the distance expressed by Equation (2) assuming that the distance between the converging lens 612 and the focusing lens 620 is shorter than xf.

It can be seen from comparison between Equations (5) and (7), and between (6) and (8) that the diameter of the ellipse in its major axis direction is in inverse proportion to lxfl since the other components constants are fixed, and also proportional to ldf/dtl in view of Equation (2). Therefore, in the case where the disk face and the detector face are located at the focal positions of the corresponding converging lens and focusing lens, the light spots on the disk and the detector have the same shape as long as ldf/dtl is unvaried irrespectively of increasing or decreasing the driving frequency for the acoustooptic element.

FIGS. 19A to 19C are directed to the case where the disk face and detector face are located at the focal positions of the corresponding converging lens and focusing lens. On the other hand, FIG. 20 shows the light spot in the neighborhood of the focal position of the converging lens 612 or the focusing lens 620.

Figure 20:
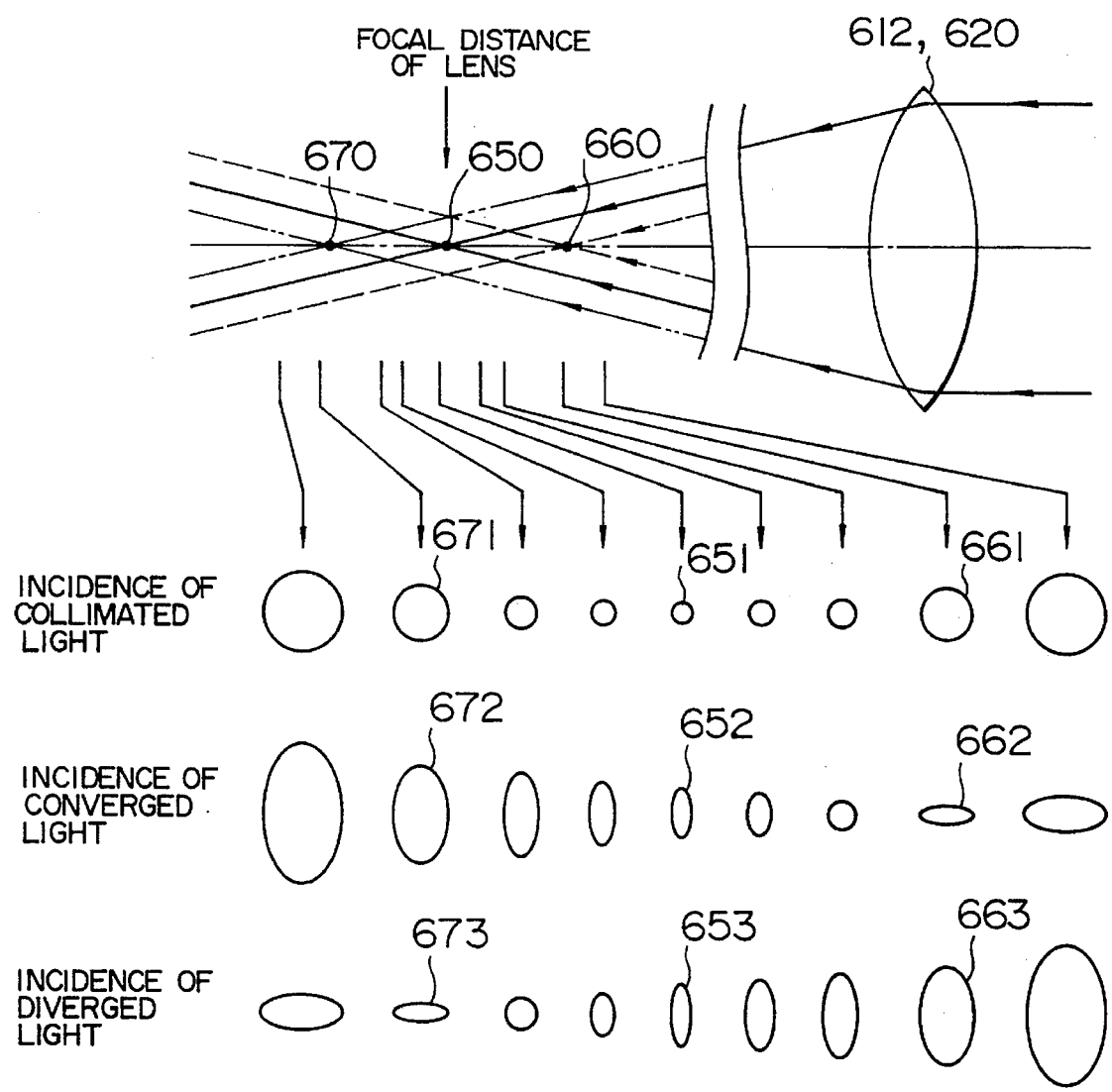
FIG. 20 is a view showing the shape of a light spot in the neighborhood of the position of the focal distance of a lens.

The upper part of FIG. 20 shows the state of the light beam in the neighborhood of focus of the converging lens 612 or focusing lens when the light beam is incident on the lens, and the lower part of FIG. 20 shows the state of the light spot corresponding to each of the positions in FIG. 20.

In FIG. 20, the state of the light beam when the collimated light is incident is designated by solid lines. The resulting light spots are circular, and their size is minimum at the position of the focus 650 of the lens. This is substantially the same as in the case of FIGS. 19A, 19B and 19C. The diameter of the spot can be expressed by Equation (2) or (3).

The state of the light beam when the converging light from the acoustooptic element is incident is designated by broken lines. The position of the focal point (line) in the direction perpendicular to paper face remains fixed whereas that position 660 in the direction parallel to the paper face approaches the lens. This provides the light spot with astigmatism so that the spot 652 at the position 650 has an elliptical shape with the same length in its minor axis direction as the spot 651 of the collimated light and a longer length in its major axis direction than the spot 651. The shapes of the spots at other positions are shown correspondingly to those of the collimated light.

The state of the light beam when the diverging light from the acoustooptic element is incident is designated by two-dot chain lines. The position of the focal point (line) in the direction perpendicular to paper face remains fixed whereas that position 670 in the direction parallel to the paper face recedes from the lens. This provides the light spot with astigmatism so that the spot 653 at the position 650 has an elliptical shape with the same length in its minor axis direction as the spot 651 of the collimated light and a longer length in its major axis direction than the spot 651. The shapes of the spots at other positions are shown correspondingly to those of the collimated light.

As described in connection with FIG. 19, if the disk or detector is located at the focal position of the lens, the shape of the elliptical spot at that position is unvaried as long as the driving frequency for the acoustooptic has a fixed changing rate as shown 652, 653. However, if the disk or detector is deviated from the focal position of the lens, the elliptical shape of the resultant spot will be different according to whether the driving frequency for the acoustooptic element is increased or decreased even if the changing rate is fixed. On the basis of this fact, a focus error signal can be obtained by detecting the shape of the ellipse using a three-divided detector 622 which will be described later in FIG. 21A.

Figure 21A:
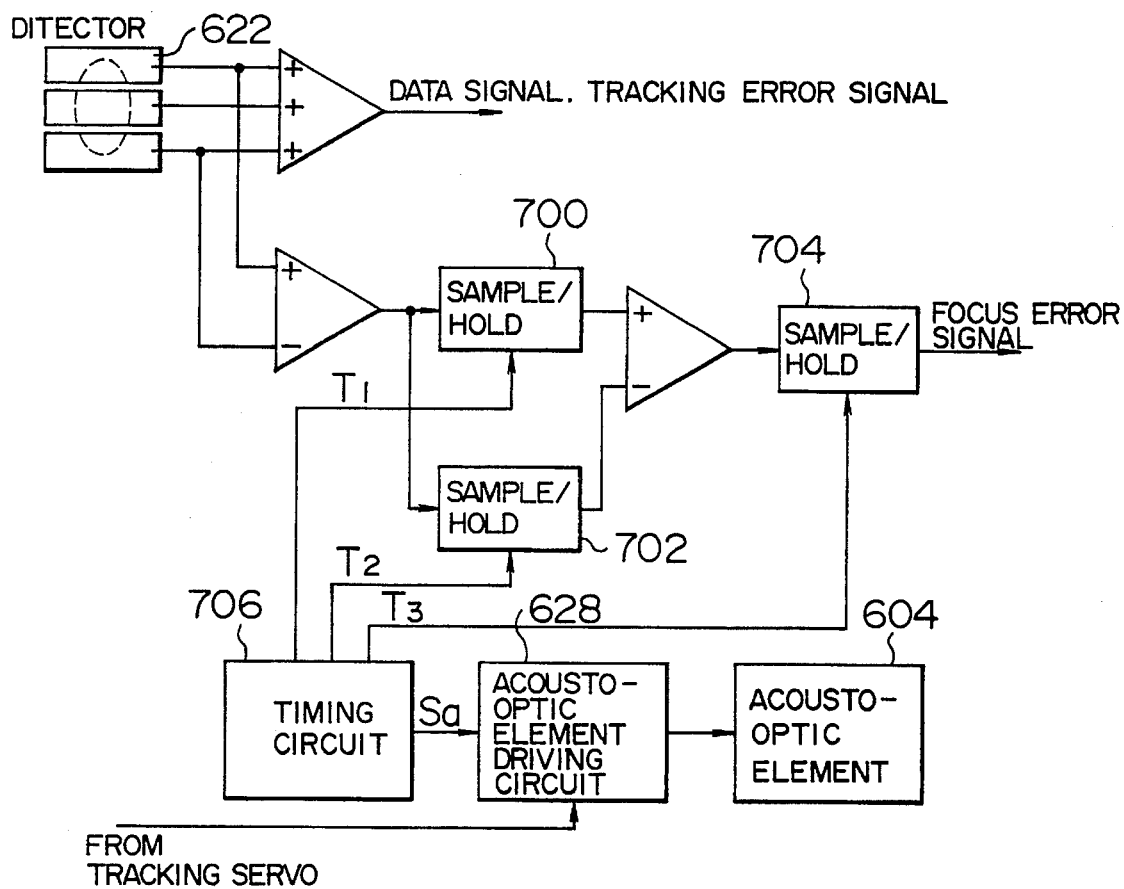
FIGS. 21A and 21B are a block diagram of a focus error signal detecting system in the first embodiment using an acoustooptic element, and a view showing the states of control signals for the system, respectively.
Figure 21B:
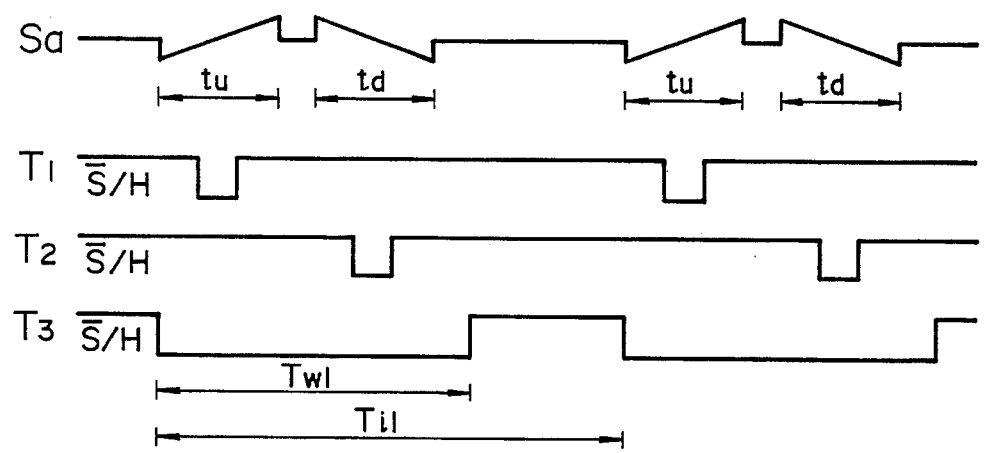

FIG. 21A shows the focus error signal detecting circuit in the first embodiment using an acoustooptic element in accordance with the present invention, and FIG. 21B shows the waveform of the control signals used for the circuit of FIG. 21A.

In the focus error signal detecting circuit of FIG. 21A, light amount signals are detected using the three-divided detector 622. If the driving frequency for the acoustooptic element 604 remains unvaried, a circular light spot will be focused on the central detecting part. On the other hand, if it is varied, the resultant light spot will be elliptical because of astigmatism so that the light spot extends onto detecting part at both ends. Further, in the case where the disk is located at the focal position of the converging lens, the ellipse has the same shape as long as |df/dt| is constant irrespectively of increasing or decreasing the driving frequency for the acoustooptic element; therefore, the sum of the outputs from both detecting parts is equal between both cases of increasing and decreasing. On the other hand, in the case where the disk is not located at the focal position of the converging lens, the ellipse has different shapes even if |df/dt| is constant according to increasing or decreasing the driving frequency for the acoustooptic element; therefore, the sum of the outputs from both detecting parts is different between both cases of increasing and decreasing. Thus, this difference can be used to provide a focus error signal. Moreover, the sum of the outputs from the detecting parts can be employed to minimize the influences from the shift of the detector position and unbalance in the distribution of amounts of reflected light due to guide grooves on the disk.

The operation of the focus error detecting circuit will be explained below. A timing circuit 706 generates an acoustooptic element control signal Sa and sample-and-hold control signals T1, T2 and T3.

The acoustooptic element control signal Sa generated by the timing circuit 706 is df/dt>0 during a sweeping period tu and df/dt<0 during a sweeping period td. The control signal Sa serves to control an acoustic element 604 through an acoustooptic element driving circuit 628. It is assumed that the sweeping periods are longer than the propagating time of the ultrasonic wave propagating through the acoustooptic element 604.

The acoustooptic element driving circuit 628 is usually constructed by a voltage-controlled oscillator (VCO) which generates a signal at the frequency in proportion to an input voltage; this signal is used to drive the acoustooptic element 604. Incidentally, a control signal from the tracking serve system is also supplied to the acoustooptic element driving circuit 628. However, the sweeping periods tu and td are usually shorter than 5 μs and the frequency band used in the tracking serve system is more narrow than 50 kHz so that the acoustooptic element control signal Sa does not almost affect the tracking serve system.

The outputs from the detector 622 during the sweeping periods are respectively sampled and held by the sample-and-hold circuits 700 and 702 which are controlled by control signals T1 and T2. Since the propagation of an ultrasonic wave through the acoustooptic element 604 requires much time, the sampling signals T1 and T2 are generated with delays from the start of the period tu or td. A sample-and-hold circuit 704 is controlled by a control signal T3 so that during the sweeping period tu or td, the focus error signal is held to prevent any oscillation of the servo system due to the acoustooptic element control signal Sa.

The period Tw1 should preferably be as short as possible. Since the acoustooptic element 604 operates at a high speed, the period Tw1 can be generally reduced to 10 μs or less. Although the internal Ti1 can be varied within the range of T1>Tw, if the interval is excessively large, phase delay of the focus error is also increased. The interval T1, therefore, is set to fall within the following range in view of the stability of the control system $$Tw1 < Ti1 < 1/(5 \cdot fc) \qquad (9)$$

where fc is the frequency band in the focus control servo system.

As understood the above description, in accordance with the first embodiment using an acoustic element, the focus error signal can be detected in such a manner that astigmatism is given to the light spot using the acoustooptic element. It should be also understood that taking the sum of three outputs from the three-divided detector 622 to detect the entire amount of reflected light is detected permits data signals to be detected. Further it should be understood that if the sample serve is used as in the embodiment using the diffraction grating described previously, a tracking error can be detected on the basis of the entire amount of reflected light. Simultaneously adopting both embodiments permits all the signals necessary for an optical disk device to be obtained so that the detecting system can be made small-sized.

Meanwhile, in the first embodiment using an acoustooptic element, in order to determine the zero point of the focus error signal, it is necessary to locate the detector at the position corresponding to the focal distance of the focusing lens. This adjustment is carried out by searching the position where the data signal is maximum or the scoop signal from the light amount monitor for a semiconductor laser is maximum. Such a manner, in which the position corresponding to the focal distance of the focusing lens is not directly observed but the detector is indirectly positioned, will necessarily involve some positioning errors. Further, if the positions where owing to temperature change and time passage, optical components are attached are shifted, or the disk is inclined, the zero position of the focus error signal will be deviated from an actual in-focus position.

These errors appear as an offset (detecting error) added to the focus error signal. The second embodiment described below intends to provide a focus error detecting method which involves no offset and can self-adjust the target for focusing.

As shown in FIG. 22A, servo pits 800 and 802 are arranged along a track center line at opposite positions deviated from the center line on a disk and data pits 804 are recorded therebetween. If the driving frequency for the acoustooptic element remains constant, a circular light spot will be focused on the track center line and slightly cover the servo pits. If it varies, an elliptical light spot will be focused because of astigmatism and so largely covers the servo pits. This greatly reduce the amount of light reflected from the disk.

In the case where the disk is located at the focal position of the converging lens, the elliptical spot has the same shape as long as |df/dt| is constant irrespectively of increasing or decreasing the driving frequency for the acoustooptic element. On the other hand, in the case where the disk is not located at the focal position of the converging lens, the elliptical spot has different shapes even if |df/dt| is constant according to increasing or decreasing the driving frequency for the acoustooptic element. FIGS. 22B, 22C and 22D show the states of reflected light when a circular light spot, a small elliptical light spot and a large elliptical light spot cross the servo pit 800, respectively. It can be seen that the ellipse having a larger diameter in its major axis direction results in larger reduction in the amount of the reflected light. Therefore, the focus error signal can be obtained on the basis of a difference between the reduction degrees in the cases of increasing and decreasing the driving frequency for the acoustooptic element.

It should be noted that the amount of reflected light can be measured without being influenced from the shift of the detector position and unbalance in the distribution of amounts of reflected light due to guide grooves on the disk. Further, unlike the first embodiment, this embodiment permits an in-focus position to be directly provided without necessity of accurately arranging the detector at the focal position of the focusing lens.

Figure 23A:
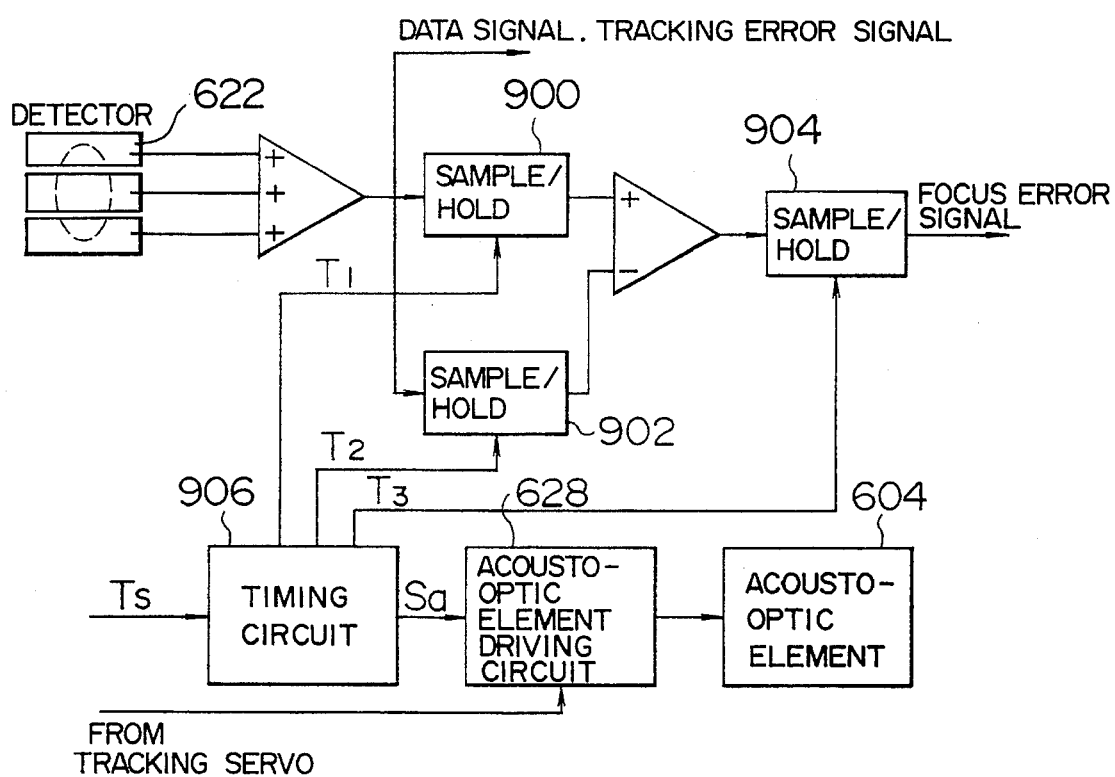
FIGS. 23A and 23B are a block diagram of a focus error signal detecting system in the second embodiment using an acoustooptic element, and a view showing the states of control signals for the system, respectively.
Figure 23B:
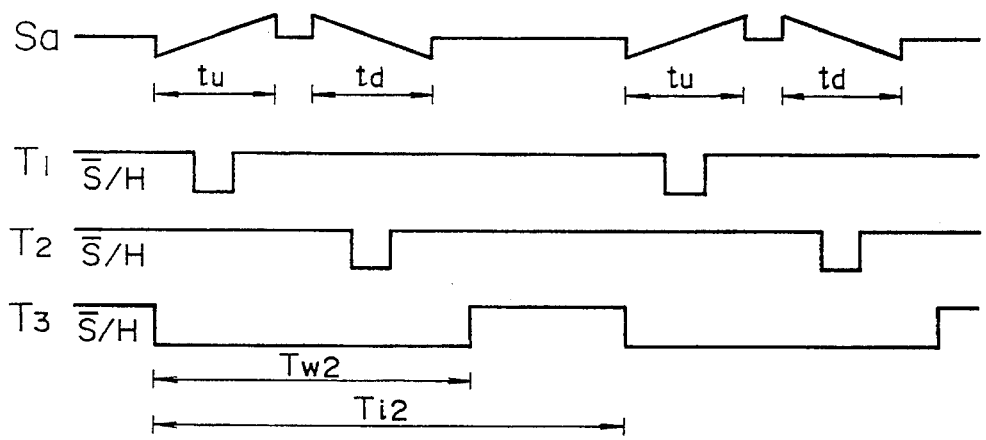

With reference to FIGS. 23A and 23B, the operation for the focus error detecting circuit will be explained. The operation thereof is substantially the same as that in FIG. 21 except that the entire amount of reflected light is supplied to the three-divided detector 622. So, only the difference will be explained.

A timing circuit 906 generates an acoustooptic element control signal Sa and sample-and-hold control signals T1, T2 and T3.

The acoustooptic element control signal Sa generated by the timing circuit 906 is df/dt>0 during a sweeping period tu and df/dt<0 during a sweeping period td. The control signal Sa serves to control an acoustic element 604 through an acoustooptic element driving circuit 628. It is assumed that the sweeping periods are longer than the propagating time of the ultrasonic wave propagating through the acoustooptic element 604. It is also assumed that the light spot is controlled to be elliptical on the servo pit using the timing signal Ts created on the basis of a rotary angle signal of the disk or the signal indicative of the reflected light amount.

The peaks of the amount of reflected light are detected by the detector 622 during the sweeping periods. The corresponding amounts of reflected light are sampled and held by the sample-and-hold circuits 900 and 902 which are controlled by control signals T1 and T2. A sample-and-hold circuit 904 which is controlled by a control signal T3 holds the focus error signal during the sweeping period tu or td to prevent any oscillation of the servo system due to the acoustooptic element control signal Sa.

Since the timings of defining the sweeping periods tu and td are in synchronism with those of the servo pits appearing on the disk, the period Tw1 and the interval Ti2 will be determined by the shape and the number of the servo pits and the rotary speed of the disk. As the interval Ti2 is increased, the phase delay of the focus error signal is also increased so that the focus controlling servo system becomes unstable. So, the number of the servo pits on one track is usually adjusted to satisfy the condition $$Ti2 < 1/(5 \cdot fc) \tag{10}$$

where fc is the frequency band in the focus control servo system.

The focus error detecting circuit according to the second embodiment is required to be previously under general focus control servo and tracking servo so that the light spot travels roughly along the track center. In order to realize this, the focusing error detecting circuit should be first subjected to the focus control servo and the tracking servo according to the first embodiment and thereafter to the more accurate focus control servo according to the second embodiment.

The servo pits used in the second embodiment may be such as shown in FIGS. 24A to 24D in addition to those shown in FIG. 22A.

Figure 24A:
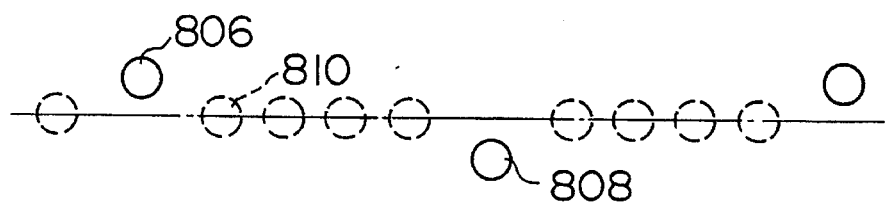
FIGS. 24A to 24D are views showing other servo pits used in the second embodiment using the acoustooptic element.

In FIG. 24A, pairs each consisting of servo pits 806 and 808 are arranged along the track center line at regular intervals and at the positions deviated with respect to the track center line on both sides thereof, and data pits 810 are arranged on the track center line between the servo pits 806 and 808. Incidentally, although in FIGS. 22, 24A and 24C (described later), the servo pits (grooves in FIG. 24C), are arranged on both sides of the track center line, they may be arranged on the same side thereof. But if they are arranged on both sides, they can be used as tracking error signal detecting pits in a sample servo system.

Figure 24B:
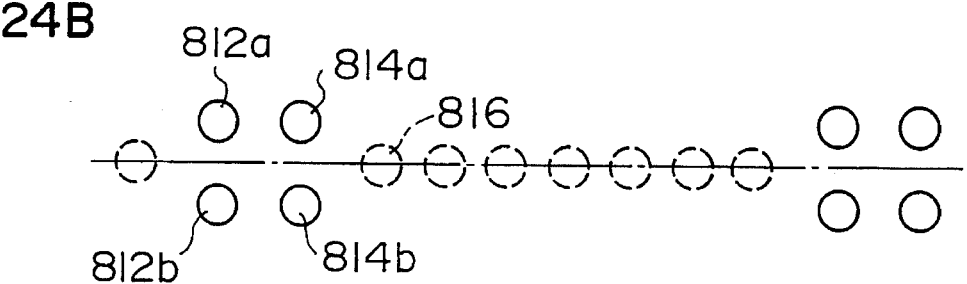

In FIG. 24B, groups each consisting of two pairs of servo pits 812a, 812b and 814b are arranged along the track center line at regular intervals and at the positions opposite with respect to the track center line on both sides thereof, and data pits 816 are arranged on the track center line between respective groups. Incidentally, since each pair of servo pits are arranged on the positions opposite with respect to the track center line on both sides thereof, even if the elliptical light spot travels along the line deviated from the track center line, the area of the elliptical spot overlapping with the servo pits will not vary so greatly, thus reducing affection on the focus error signal.

Figure 24C:
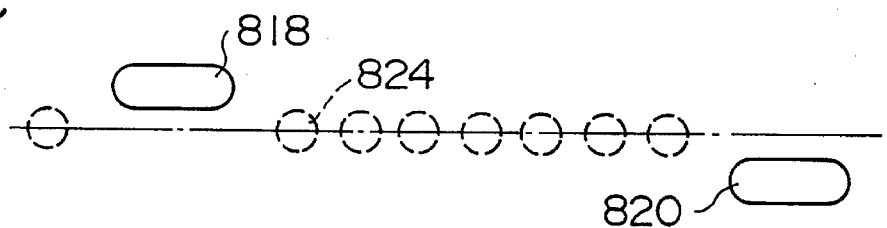

In FIG. 24C, pairs each consisting of servo grooves 818 and 820 are arranged along the track center line at regular intervals and at the positions deviated with respect to the track center line on both sides thereof, and data pits 824 are arranged on the track center line between the servo grooves 818 and 920. In this case, since the elliptical light spot has only to overlap with these grooves, timings of generating the sweeping periods tu and td can be easily taken.

Figure 24D:
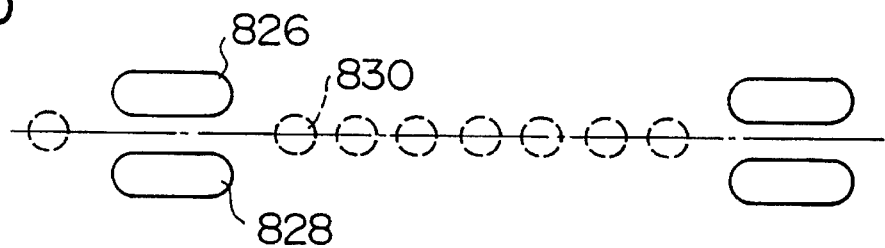

In FIG. 24D, groups each consisting of a pair of servo grooves 826 and 828 are arranged along the track center line at regular intervals and at the positions opposite with respect to the track center line on both sides thereof, and data pits 830 are arranged on the track center line between respective groups. Since each pair of servo grooves are arranged on the positions opposite with respect to the track center line on both sides thereof, even if the elliptical light spot travels along the line deviated from the track center line, the area of the elliptical spot overlapping with the servo grooves will not vary so greatly, thus reducing affection on the focus error signal.

In accordance with this embodiment, an accurate in-focus position can be directly obtained since the amount of reflected light can be detected without being influenced from the shift of the detector position and unbalance in the distribution of amounts of reflected light due to guide grooves on the disk.

In the second embodiment, the relationship expressed by Equation (10) is required between the interval Ti2 of the servo pits appearing on the disk and the frequency band in the focus control servo system If the band in the focus control servo system is 2 kHz, the interval Ti2 must be Ti2<100 μs. With the rotary speed of the disk of 2400 rpm (40 Hz), 250 or more servo pits are required. In this case, the rate occupied by the servo pits is large so that the data recording area will be decreased.

A great shift between the converging lens and the disk will occur in accordance with the rotary frequency when the disk rotates. The rotary frequency of the disk is lower by about two orders of magnitude than the band in the focus control servo system. Further, the offset which cannot be removed by the first embodiment is also synchronous with the rotary frequency of the disk or only varies within the range approximately equal to a DC level. So, in the third embodiment using an acoustooptic element, the first embodiment is combined with the second embodiment to enhance only the servo gain in a low range in the second embodiment. In accordance with the third embodiment, without increasing the number of servo pits so greatly, the ratio of suppressing disturbance and also the offset can be suppressed.

Figure 25:
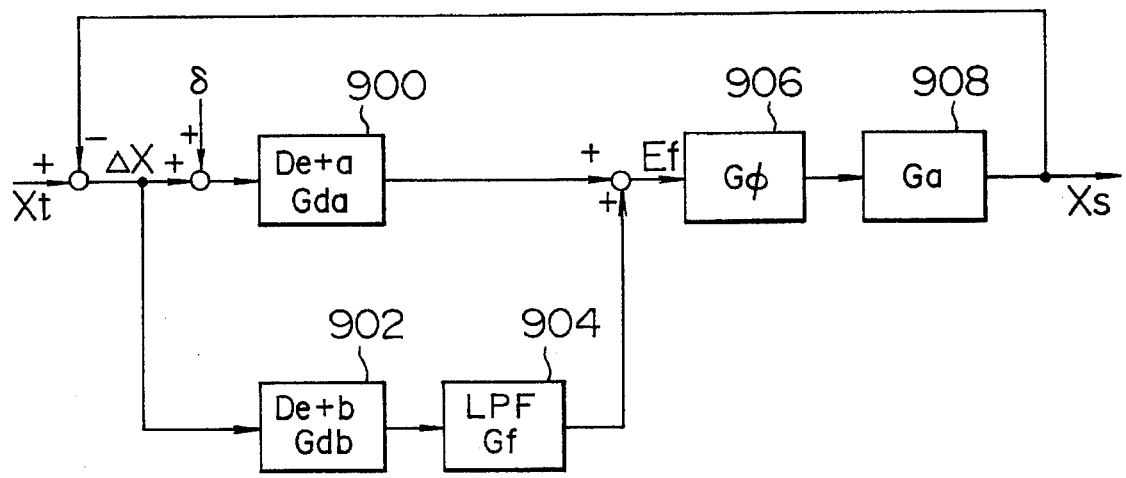
FIG. 25 is a block diagram of a focus control servo system according to the third embodiment using the acoustooptic element.

FIG. 25 is a block diagram of the focus error control servo system according to the third embodiment. Deta 900 represents the circuit according to the first embodiment having the characteristic of GDa. Detb 902 represents the circuit according to the second embodiment having the characteristic of GDb. The offset of the focus error signal in the first embodiment is represented by δ. The output from the Detb 902 is passed through a low pass filter (LPF) and added to the output from the Deta 900 to provide Ef. The characteristic of LPF 904 is represented by Gf. The focus error signal Ef is passed through a phase compensation circuit 906 having the characteristic of Gφ and supplied to a focus shifting mechanism driving circuit a focus shifting mechanism 908 having the characteristic of Ga. In FIG. 25, Xt denotes the tracking target for a light spot; Xs denotes the position of the light spot; and ΔX denotes a tracking error.

Figure 26:
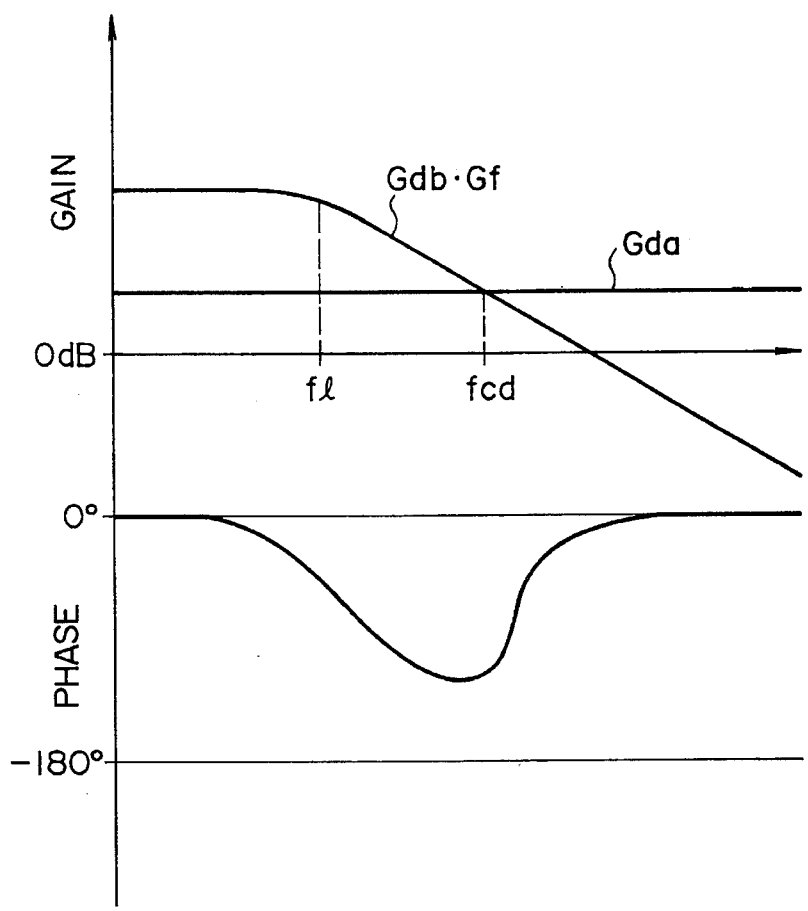
FIG. 26 is a graph showing the characteristic of the focus error detecting system of FIG. 25.
Figure 27A:
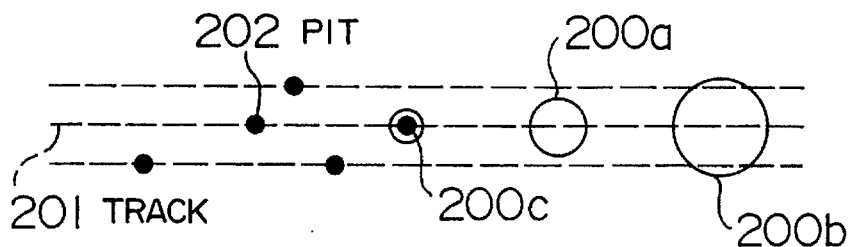
FIGS. 27A and 27C are views for explaining the problems of the second related art.
Figure 27B:
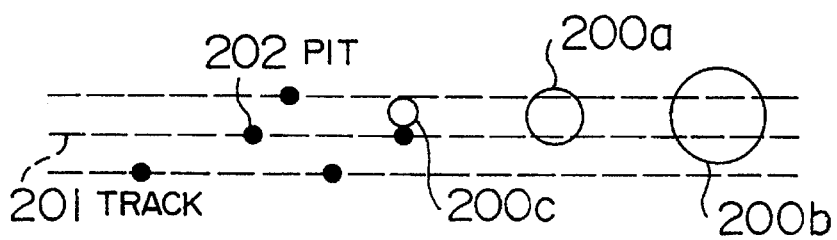
Figure 27C:
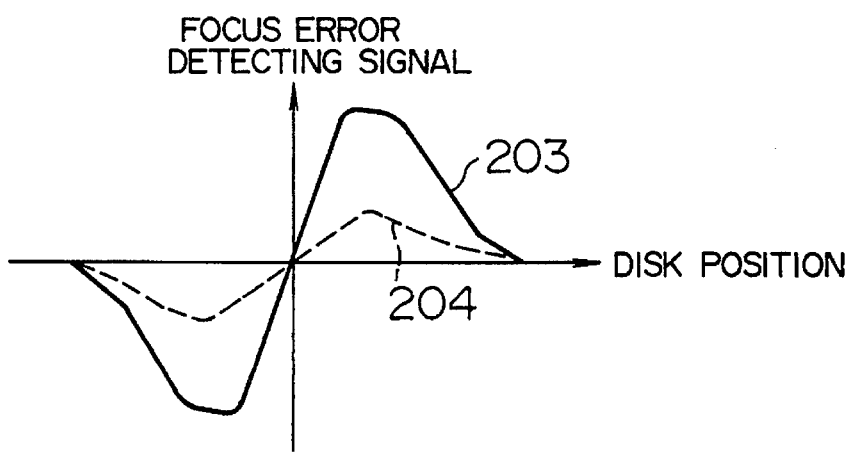

FIG. 26 shows the Bode diagram of the focus error signal detecting system, i.e. the characteristic from Δf to Ef. As seen from FIG. 26B, the gain characteristic of Gda is flat until the high frequency range. Although the phase characteristic thereof has a lag in the high frequency range since the focus error signal is taken discretely, the lag is negligible in the band in the focus error control system. The gain characteristic of Gdb is also flat but the gain in the high frequency is lowered using LPF. The break frequency fl of LPF is set to be substantially equal to the rotary frequency of the disk so that the ratio of suppressing disturbance at the frequency lower than the break frequency of LPF can be made larger by the ratio of |Gdb·Gf/Gda| than in the case of using only Deta.

The frequency at the gain cross point of Gdb·Gf and Gda is represented by fcd. In the focus error detecting system, the characteristic of Ddb·Gf is dominant at the frequency lower than fcd whereas that of Gda is dominant at the frequency higher than fcd. Thus, even if the number of servo pits in the second embodiment is reduced thereby to provide Gdb with a large phase delay, the characteristic of Gda is dominant at the frequency higher than fcd so that a very small phase delay results in the frequency band fc in the focus error control servo system; thus the stability of the servo system is not influenced. In this way, the number of servo pits can be reduced to prevent the data area from being decreased.

In order to obtain the response to δ, the block diagram of FIG. 25 will be solved with respect to ΔX. Then, Δx can be expressed by $$\Delta X = \frac{Xt}{G\phi \cdot Ga(Gda + Gdb \cdot Gf)} - \frac{Gda}{Gdb \cdot Gf} \cdot \delta \quad (11)$$

For example, it is assumed that the rotary speed of the disk is 2400 rpm (40 Hz), the number of servo pits for one track is 50, the break frequency of LPF is 40 Hz, and fcd=400 Hz. Then, in accordance with this embodiment, the ratio of suppressing disturbance at 40 Hz can be enhanced by 20 dB as compared with the case of using only Gda and the offset for Gda can be suppressed by 20 dB to 1/10. The phase delay in the focus error detecting system at fcd is about 126° whereas the phase delay in the neighborhood of the band fc=2 KHz in the focus control servo system is negligibly small.

While particular embodiments of the present invention have been shown and described, it will be obvious to those skilled in the art that various changes and modifications may be made without departing from the present invention in its broader aspects.

We claim:

1. A focus error detecting method comprising the steps of:

emitting a light beam from a light source, giving positive (+) astigmatism having two focal lines and negative (−) astigmatism having two focal lines to the light beam emitted, focusing the light beam provided with the astigmatism onto an information recording surface, receiving the light beam reflected from the information recording surface by a photo-detecting element, and comparing the light beam with positive astigmatism and negative astigmatism received by the photo-detecting element to calculate a difference therebetween, thus providing a focus error detecting signal.

2. A focus error detecting method in which an information recording surface is used on which a large number of marks for modulating the amount of the reflection light of projected beams are intermittently located in a track traveling direction and these marks are aligned in the direction within a range of at least several tracks, comprising the steps of:

in a focusing optical system including a diffraction element used to permit a part of the beam emitted from a light source as a main beam to pass and generate a pair of sub-beams having positive astigmatism with two focal lines and negative astigmatism with two focal lines in the direction different from the main beam at a minute angle, through the diffraction element, focusing the main beam on the information recording surface as a main spot whereas focusing the pair of sub-beams at the positions different from the main spot in the focal point direction and the track traveling direction;

taking out the beams reflected from the information recording surface separately from the optical path of the focusing optical system so that the reflection beams of the pair of sub-beams are received by two photo-detecting elements; and detecting the amplitudes of the reflection beams of the pair of sub-beams which are modulated by the marks in terms of the outputs from the two photo-detecting elements, thereby providing a focus error detecting signal based on a difference therebetween.

3. A focus error detecting method according to claim 2, wherein said diffraction grating includes a group of linear grating grooves with gradually varying non-equal intervals therebetween.

4. A focus error detecting method according to claim 2, wherein said diffraction grating includes a group of grating grooves having the shapes of arcs cut from concentric ellipses with gradually varying non-equidistant pitches, the origin of said concentric ellipses being eccentric from the optical axis of said main beam.

5. A focus error detecting method according to claim 2, further comprising the steps of:

sampling and holding the level of the output from each of said photo-detecting elements when each of said sub-beams is located on each of said marks, sampling and holding the level of the output from each of said photo-detecting elements when each of said sub-beams is not located on the mark, and detecting the amplitude of the reflection beam of the sub-beams which is modulated by the mark on the bases of a difference between said sampled and held levels.

6. In a focus error detecting method according to claim 2, wherein said information recording face is used on which first plurality of pits serving as said marks are arranged on one side of a track center line and apart from the center line by a certain distance, and second plurality of pits serving as said marks are arranged on the other side of the track center line and apart from the center line by the same distance, a method for detecting a control signal for light spots comprising:

detecting a focus error using the focus error detecting method according to claim 2;

receiving the reflection light of the main beam by a photo-detecting element; and detecting, on the bases of the output from said photo-detecting element, signal levels when the main beam passes said first pits and said second pits to provide a difference therebetween, thus providing a tracking error detecting signal from the difference.

7. An optical head for projecting a light beam on an information recording surface on which a large number of marks for modulating the amount of the reflection light of projected beams are intermittently located in a track traveling direction and these marks are aligned in the direction nearly perpendicular to the track traveling direction within a range of at least several tracks, comprising:

a light source;

a focusing optical system including a diffraction grating located on the optical path of the beam for permitting a part of the beam emitted from the light source as a main beam to pass and generate a pair of sub-beams having positive astigmatism with two focal lines and negative astigmatism with two focal lines in the direction different from the main beam at a minute angle, the focusing optical system for focusing the main beam on the information recording surface as a main spot while focusing the pair of sub-beams at the positions different from the main spot in the focal point direction and the track traveling direction;

separated optics for taking out the beams reflected from the information recording surface separately from the optical path of the focusing optical system;

photo-detecting means for receiving the reflection beams, including at least two photo-detecting elements for receiving the reflection beams of the pair of sub-beams, respectively; and a focus error detecting circuit for detecting the amplitudes of the reflection beams of the pair of sub-beams which are modulated by the marks in terms of the output from the two photo-detecting elements, thereby providing a focus error detecting signal based on a difference therebetween.

8. An optical head according to claim 7, wherein said diffraction grating includes a group of linear grating grooves with gradually varying non-equal intervals therebetween.

9. An optical head according to claim 7, wherein said diffraction grating includes a group of grating grooves having the shapes of arcs cut from concentric ellipses with gradually varying non-equal intervals, the origin of said concentric ellipses being eccentric from the optical axis of said main beam.

10. An optical head according to claim 7, wherein said focus error detecting circuit comprises a pair of amplitude detecting circuits for detecting the amplitudes of the reflection beams of the pair of sub-beams which are modulated by the marks, respectively; and a first differential operation circuit for taking a difference between the outputs from said pair of amplitude detecting circuits.

11. An optical head according to claim 10, wherein each of said amplitude detecting circuit comprises:

a first sample-and-hold circuit for holding the level of the output from each of said photo-detecting elements when each of said sub-beams is located on each of said marks, a second sample-and-hold circuit for holding the level of the output from each of said photo-detecting elements when each of said sub-beams is not located on the mark, and a second differential operation circuit for calculating a difference between the outputs from said first and second sample-and-hold circuits.

12. An optical head according to claim 11, wherein each of said amplitude detecting circuits comprises a switch circuit for always placing the polarity of the output form said second differential operation circuit in a positive level or a negative level.

13. An optical head according to claim 7, wherein said marks include first plurality of pits arranged on one side of a track center line and apart from the center line by a certain distance, and second plurality of pits arranged on the other side of the track center line and apart from the center line by the same distance; and said photo-detecting means comprises a photo-detecting element for receiving the reflection light of the main beam and a tracking error detecting circuit for detecting, on the bases of the output from said photo-detecting element, the levels when the main beam passes said first pits and said second pits to provide a difference therebetween, thus providing a tracking error detecting signal from the difference.

14. A focus error detecting method comprising the steps of:

emitting a light beam from a light source;

providing positive astigmatism having two focal lines and negative astigmatism having two focal lines to the beam using an acoustooptic element by varying a driving frequency therefor;

focusing the beam provided with the astigmatism on an information recording surface;

receiving the beam reflected from the information recording surface; and comparing the reflected beams with the positive astigmatism and the negative astigmatism to calculate a difference therebetween and providing a focus error detecting signal on the basis of the difference.

15. A focus error detecting method according to claim 14, wherein in the step of providing the astigmatism, said acoustooptic element is an element using a surface elastic wave.

16. A focus error detecting method according to claim 14, wherein in the step of providing the astigmatism, the driving frequency for the acoustooptic element is varied linearly.

17. A focus error detecting method according to claim 14, wherein said acoustooptic element is also used for a tracking operation for positioning said beam on a target track.

18. A focus error detecting method comprising the steps of:

emitting a light beam from a light source;

providing positive astigmatism and negative astigmatism to the beam using an acoustooptic element by varying a driving frequency therefor;

focusing the beam provided with the astigmatism on an information recording surface;

receiving the beam reflected from the information recording surface; and comparing the reflected beams with the positive astigmatism and the negative astigmatism to calculate a difference therebetween and providing a focus error detecting signal on the basis of the difference;

wherein the position of a circle of least confusion of a light spot due to positive and negative astigmatism is changed in a time-divisional manner.

19. A focus error detecting method according the claim 18, wherein the light beam reflected from said information recording surface is given the positive and negative astigmatism by giving the positive and negative astigmatism to the light beam to be focused on the information recording surface, and the focus error signal is obtained by changing the shape of the light spot on the photo-detecting element.

20. A focus error detecting method according to claim 19, wherein said photo-detecting element is three-divided in the direction in which the light spot shape on the photo-detecting element is changed by giving astigmatism to the light beam to be focused on the information recording surface.

21. A focus error detecting method according to claim 20, wherein in the step of receiving the reflected beam by the photo-detecting element, if the light beam to be focused on the information recording surface is not given the astigmatism, the light spot is projected onto only the central part of said three-divided photo-detecting element whereas if it is given the astigmatism, the light spot is projected to be extend to both end parts of the three-divided detecting element, and in the step of obtaining the focus error detecting signal, the sums of the outputs from both end parts of said three-divided photo-detecting element are compared.

22. A focus error detecting method according to claim 18, further comprising the step of providing pits on the information recording surface in such a manner that in the cases where the circle of least confusion of the light spot is shifted in the light beam incident direction and the direction opposite thereto owing to said positive and negative astigmatism, the pits give the same modulation ratio in the light amount of the reflected beam if the surface is a in-focus position while different modulation ratios if the surface is in an out-of-focus position.

23. A focus error detecting method according to claim 22, wherein in the step of obtaining the focus error detecting signal, the modulation ratios in the light amount of the reflected beam are compared between the cases where the circle of least confusion of the light spot is shifted in the light beam incident direction and the direction opposite thereto.

24. A focus error detecting method according to claim 22, wherein in the step of providing pits, a plural sets of pair of pits are arranged, each pair of pits being apart from each other in a light spot traveling direction and deviated from each other in the direction perpendicular thereto.

25. A focus error detecting method according to claim 24, wherein each of said pits is long in the light spot traveling direction.

26. A focus error detecting method according to claim 22, wherein in the step of providing pits, a plural sets of pair of pits are arranged, each pair of pits being located at the same position in a light spot traveling direction and deviated from each other in the direction perpendicular thereto.

27. A focus error detecting method according to claim 26, wherein each of said pits is long in the light spot traveling direction.

28. A focus error detection method according to claim 14, wherein in the step of obtaining the focus error detecting signal, the signal is obtained by changing the spot shape of the reflection beam received by the photo-detecting and also changing the reduction degree in the reflection light amount.

29. An optical head comprising:

a light source for emitting a light beam;

a focusing optical system including an acoustooptic element, located on the optical path of the beams emitted from the light source, for supplying positive astigmatism having two focal lines and negative astigmatism having two focal lines to the beams by varying the frequency of the acoustooptic element so that the beams are focused as spots on the information recording surface;

separated optics for taking out the beams reflected from the information recording surface separately from the optical path of the focusing optical system;

a photo-detecting element for receiving the reflected beams thus separated;

an acoustooptic element driving circuit for varying the frequency of the acoustooptic element;

a focus error detecting circuit for comparing the reflected beams with positive astigmatism and negative astigmatism received by the photo-detecting means to calculate a difference therebetween and producing a focus error detecting signal on the basis of this difference; and a control circuit for controlling the focusing optical system on the basis of the focus error detecting signal and focusing the beams at the focusing position on the information recording surface.

30. A focus error detecting method according to claim 14, wherein the step of comparing the reflective beams includes comparing an optical spot shape with positive astigmatism and negative astigmatism received on a photo-detecting element to calculate a difference therebetween and providing a focus error detecting signal on the basis of the difference and comparing the reflective beam amount with a positive astigmatism and the negative astigmatism to calculate a difference therebetween and providing a focus error detecting signal on the basis of the difference.

* * * * *